United States Patent
Choi et al.

(10) Patent No.: US 10,414,674 B2
(45) Date of Patent: Sep. 17, 2019

(54) BISMUTH-BASED CHLORIDE-STORAGE ELECTRODES

(71) Applicant: Wisconsin Alumni Research Foundation, Madison, WI (US)

(72) Inventors: Kyoung-Shin Choi, Fitchburg, WI (US); Dohwan Nam, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 344 days.

(21) Appl. No.: 15/408,980

(22) Filed: Jan. 18, 2017

(65) Prior Publication Data
US 2018/0201524 A1    Jul. 19, 2018

(51) Int. Cl.
| | | |
|---|---|---|
| *C02F 1/46* | (2006.01) | |
| *H01M 10/44* | (2006.01) | |
| *H01M 10/00* | (2006.01) | |
| *C02F 1/461* | (2006.01) | |
| *C02F 103/08* | (2006.01) | |

(52) U.S. Cl.
CPC .......... *C02F 1/4604* (2013.01); *H01M 10/44* (2013.01); *C02F 2001/46133* (2013.01); *C02F 2001/46161* (2013.01); *C02F 2103/08* (2013.01)

(58) Field of Classification Search
CPC .......... C02F 1/4604; C02F 2001/46133; C02F 2103/08; H01M 10/44
See application file for complete search history.

(56) References Cited

U.S. PATENT DOCUMENTS

| | | | |
|---|---|---|---|
| 7,494,583 | B2 | 2/2009 | Weres |
| 8,889,281 | B2 | 11/2014 | La Mantia et al. |
| 2008/0107965 | A1 | 5/2008 | Suzuki et al. |
| 2013/0319876 | A1 | 12/2013 | Hsieh |
| 2016/0072128 | A1 | 3/2016 | Pasta et al. |
| 2016/0230291 | A1 | 8/2016 | Albrecht et al. |

FOREIGN PATENT DOCUMENTS

| | | |
|---|---|---|
| CN | 105821436 | 8/2016 |
| GB | 1358926 | 7/1974 |

OTHER PUBLICATIONS

Ping Gao et al. "Vanadium oxychloride as electrode material for sodium ion batteries" Electrochemistry Communications. Sep. 25, 2015. pp. 180-184 (Year: 2015).*
Ke-Lei Zhang et al. "Study of the electronic structure and photocatalytic activity of the BiOCl photocatalyst" Applied Catalysis B: Environmental. Sep. 7, 2006. pp. 125-129 (Year: 2006).*
(Continued)

*Primary Examiner* — Steven A. Friday
(74) *Attorney, Agent, or Firm* — Bell & Manning, LLC; Michelle Manning

(57) ABSTRACT

Bismuth-based, chloride-storage electrodes and rechargeable electrochemical cells incorporating the chloride-storage electrodes are provided. Also provided are methods for making the electrodes and methods for using the electrochemical cells to remove chloride ions from a sample. The chloride-storage electrodes, which are composed of bismuth metal, can store chloride ions in their bulk by forming BiOCl via an oxidation reaction with bismuth in the presence of an oxygen source.

11 Claims, 14 Drawing Sheets

(56) References Cited

OTHER PUBLICATIONS

International Search Report and Written Opinion mailed in PCT/US2017/059366, dated Jan. 12, 2018.
Nam et al., Bismuth as a New Chloride-Storage Electrode Enabling the Construction of a Practical High Capacity Desalination Battery, Journal of the American Chemical Society, vol. 139, Aug. 4, 2017, pp. 11055-11063.
Pasta et al., A Desalination Battery, Nano Lett., 12, Jan. 23, 2012, pp. 839-843.
Zhang et al., Bismuth oxychloride ultrathin nanoplates as an anode material for sodium-ion batteries, Materials Letters 178, Apr. 26, 2016, pp. 44-47.

\* cited by examiner

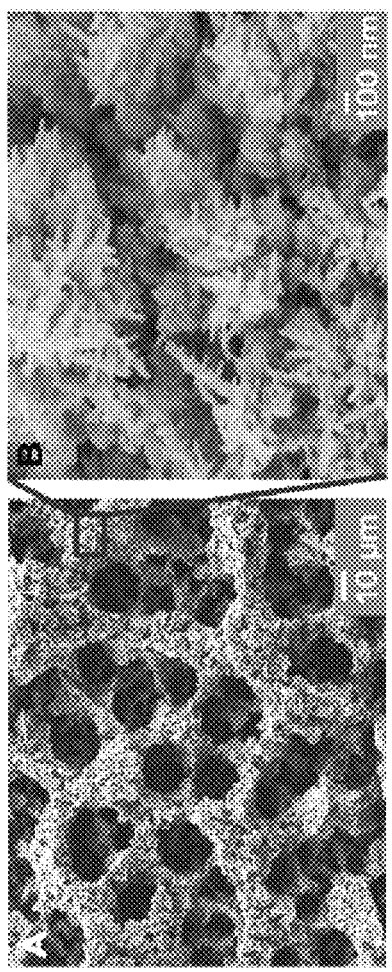
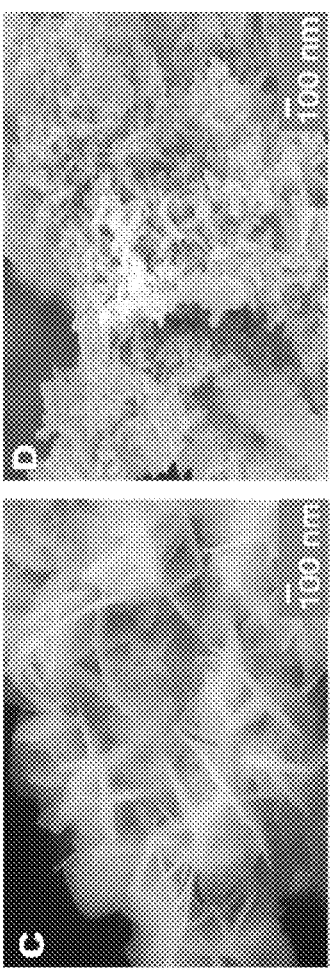
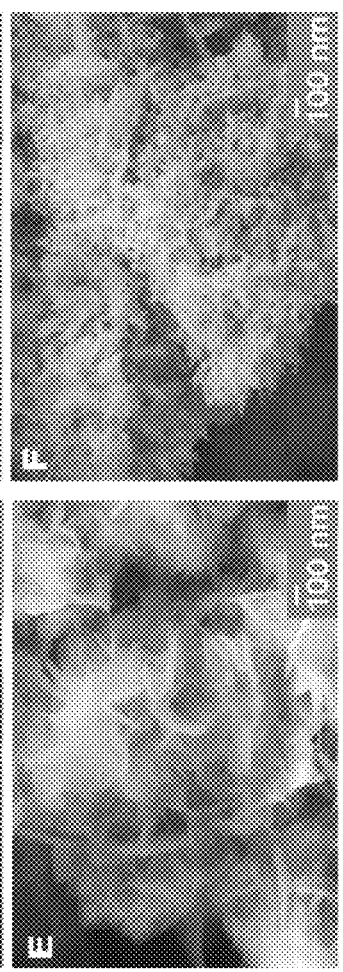
FIG. 2A  FIG. 2B  FIG. 2C  FIG. 2D  FIG. 2E  FIG. 2F FIG. 5A
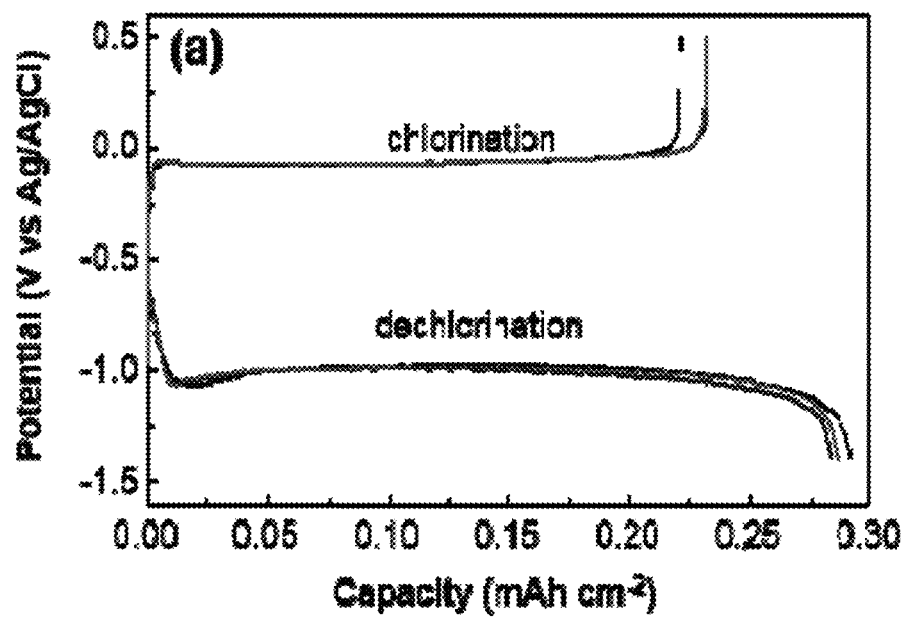
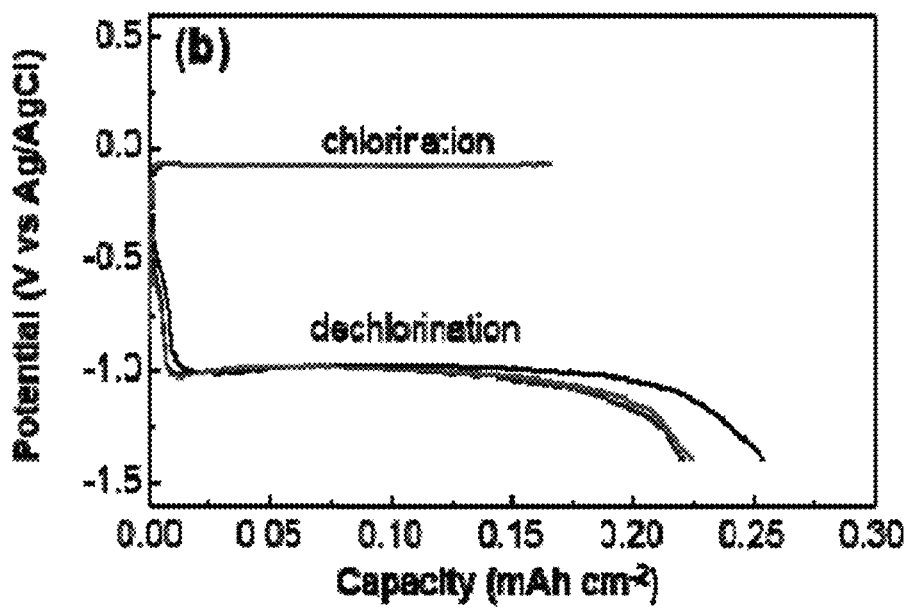
FIG. 5B

BISMUTH-BASED CHLORIDE-STORAGE ELECTRODES

REFERENCE TO GOVERNMENT RIGHTS

This invention was made with government support under DMR-1121288 awarded by the National Science Foundation. The government has certain rights in the invention.

BACKGROUND

With the steady growth in human population, as well as rapid development of industry and agriculture, access to fresh water is a serious issue. Considering the abundance of seawater on Earth, desalination, which separates dissolved salt ions from a saline feed water source to produce fresh water, is a viable option to achieve an adequate supply of fresh water. Reverse osmosis (RO) is considered an advanced technology for the desalination of seawater. However, RO desalination requires considerable electrical energy input. From the perspective of energy management, capacitive deionization (CDI), which removes salt ions by capturing them in the electrical double layer of high surface area electrodes, is a highly promising alternative, as its operating cost can be reduced significantly compared to the operating cost of RO. However, CDI has limitations in desalinating highly concentrated feed water, such as seawater, because the amount of salt ions that can be stored in the electrical double layer is limited even when high surface area nanoporous carbon electrodes are used. Therefore, CDI has been developed mainly for use in desalination of brackish water.

In order to increase the capacity of an electrode for electrochemical salt removal, salt ions should be stored not just in the double layer but in the bulk of the electrode through the formation of chemical bonds. For example, Pasta et al. constructed a desalination cell by combining $MnO_2$ as the Na-storage electrode and Ag as a Cl-storage electrode, where $Na^+$ and $Cl^-$ ions were stored within the electrode structures forming new phases, $Na_2Mn_5O_{10}$ and AgCl, respectively. (M. Pasta, C. D. Wessells, Y. Cui, F. L. Mantia, A desalination battery, Nano Lett. 12, 839-843 (2012).) If the desalination cell can store and release salt ions repeatedly through the charging and discharging process, and the discharging process can partially recover the energy consumed during the charging process, such a cell can be considered a rechargeable "desalination battery" and has the potential to achieve desalination with a minimum overall energy input. Considering that the high cost of Ag and the poor electrical conductivity of AgCl limit the use of Ag for practical, large scale desalination cells, the development of desalination batteries depends on the discovery of more efficient, stable, and practical Cl-storage electrodes.

SUMMARY

Chloride-storage electrodes composed of bismuth metal and electrochemical cells incorporating the chloride-storage electrodes, including rechargeable electrochemical desalination cells, are provided. Methods for making the electrodes and methods for using the electrochemical cells to remove chloride ions from a sample, such as seawater, are also provided.

One embodiment of an electrochemical cell comprises: a chloride-storage electrode comprising bismuth metal; an electrolyte solution comprising chloride ions in contact with the chloride-storage electrode; a second electrode in electrical communication with the chloride-storage electrode; and an electrolyte solution in contact with the second electrode. The electrolyte solution in contact with the second electrode can be either the electrolyte solution comprising chloride ions that is in contact with the first electrode or a different electrolyte solution.

One embodiment of method for removing chloride ions from an electrolyte solution using an electrochemical cell of the type described herein comprises generating a flow of electrons from the chloride-storage electrode to the second electrode, whereby bismuth in the chloride-storage electrode is oxidized to form BiOCl and a reduction reaction occurs at the second electrode.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 2A shows the morphology of a Bi electrode using a low magnification scanning electron microscope (SEM) image showing the foam structure. FIG. 2B depicts the morphology of a Bi electrode using a high magnification SEM image showing the nanocrystalline wall of the Bi foam electrode. FIG. 2C shows a SEM image of a BiOCl electrode obtained by a first Cl-storage process. FIG. 2D shows a SEM image of a Bi electrode after the first Cl-release process. FIG. 2E shows a SEM image of a BiOCl electrode after a second Cl-storage process. FIG. 2F shows a SEM image of a Bi electrode after the second Cl-release process.

FIG. 5A shows potential-capacity plots of a Bi electrode for the first three chlorination/dechlorination cycles at ±2 mA $cm^{-2}$ in 0.6 M NaCl in the voltage range of 0.5 V and −1.4 V vs. Ag/AgCl. FIG. 5B depicts potential-capacity plots of the Bi electrode for the first three chlorination/dechlorination cycles using the same conditions except that the initial chlorination capacity was restricted to 0.1756 mAh $cm^{-2}$, which is 80% of the initial chlorination capacity shown in FIG. 5A.

DETAILED DESCRIPTION

Figure 1A:
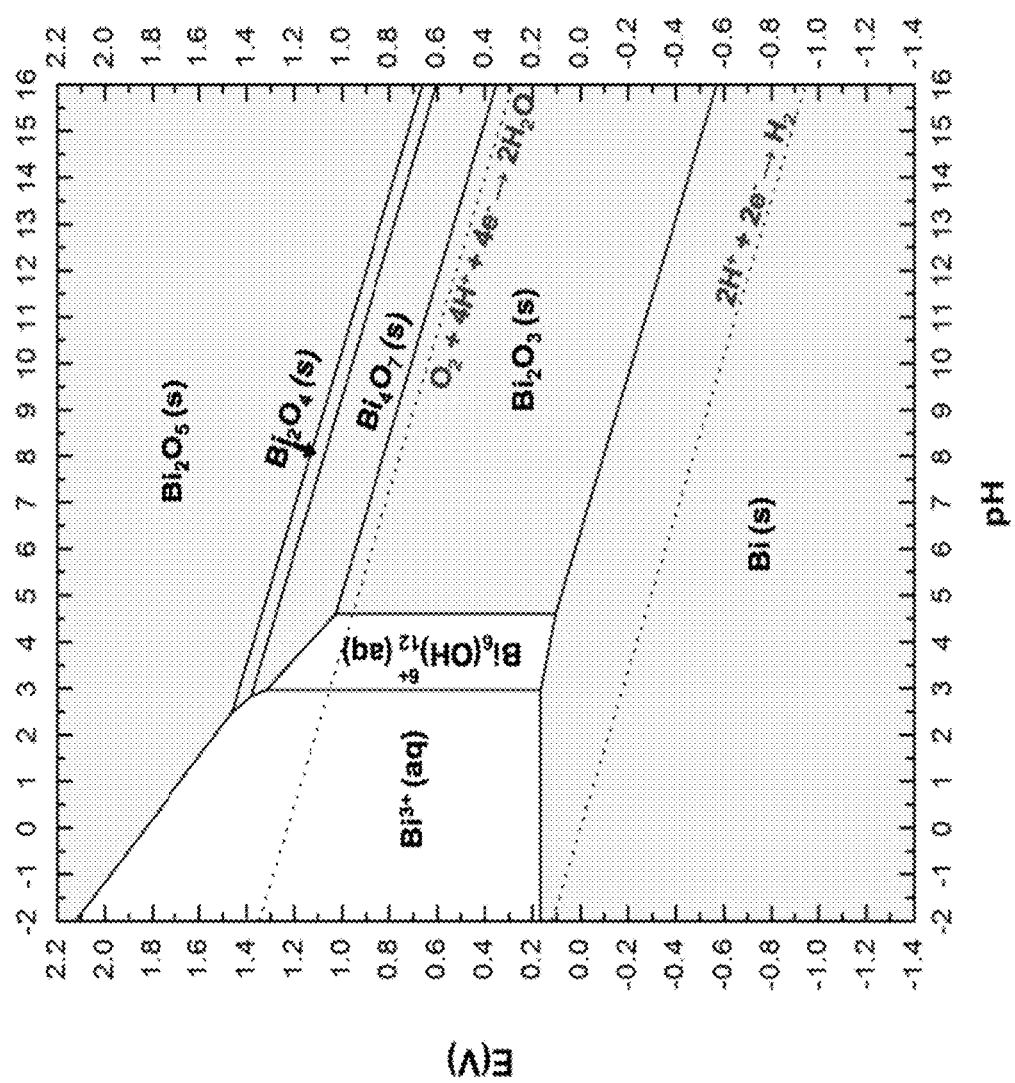
FIG. 1A shows a Pourbaix diagram for Bi in pure water.

Bismuth-based, chloride-storage electrodes and rechargeable electrochemical desalination cells incorporating the chloride-storage electrodes are provided. Also provided are methods for making the electrodes and methods for using the desalination cells to remove chloride ions from a sample.

The chloride-storage electrodes are composed of bismuth metal. The electrodes are able to store chloride ions (Cl$^-$) in their bulk by oxidizing Bi to BiOCl in the presence of an oxygen source, such as water. BiOCl is insoluble in water over a wide pH range and inert against water oxidation and oxidatively stable over a wide range of anodic potentials. As such, bismuth metal electrodes can be used to remove chloride from a variety of aqueous sources. The BiOCl electrode can be converted back into a Bi electrode by a reduction reaction, where Cl$^-$ ions are released into the electrolyte. This reverse reaction allows for the repeated use of the Bi electrode for Cl storage and Cl release via multiple chlorination and dechlorination cycles.

A chloride-storage electrode can be coupled with a sodium-storage electrode to construct a rechargeable desalination cell capable of desalinating seawater (including ocean water). Some embodiments of the desalination cells are able to perform a desalination/salination cycle with a net potential input of only 0.2 V.

The storage of Cl$^-$ ions by the Bi electrode is based on the diffusion of Cl$^-$ ions in the electrolyte into the Bi lattice to form a new crystalline phase, BiOCl. Therefore, in order to increase the capacity of Cl storage in the Bi electrode, it is advantageous to produce Bi electrodes as nanocrystalline electrodes with a high porosities, which provides them with a high Bi/electrolyte interface area. For example, electrodeposition of bismuth can be used to provide a porous nanocrystalline bismuth foam. The electrodeposition of bismuth onto a support substrate can be carried out in an electrochemical cell that includes the support substrate as a working electrode and further includes a counter electrode. When the support substrate is contacted with an aqueous electrolyte that includes a bismuth source, such as a bismuth halide salt, and an electric potential is applied across the electrochemical cell, bismuth is plated onto the support substrate via cathodic deposition, while water is simultaneously reduced to H$_2$ (g). The H$_2$ bubbles formed at the support substrate surface provide an in-situ generated template around which the bismuth forms a porous microstructure. Other methods of fabricating porous bismuth can also be used.

Embodiments of the nanocrystalline bismuth foam are macroporous, having pore sizes in the range from 1 μm to 100 μm. The walls that define the pores in the nanocrystalline bismuth foams are characterized by crystalline dendrites—short branched extensions—with cross-sectional diameters that are typically less than 100 nm. These dendrites extend outwardly along the lengths of larger elongated "stems". As discussed in more detail in the Example, this porous, nanocrystalline morphology can reduce or prevent pulverization due to the volume expansion and contraction of the electrode during cell cycling.

In an electrochemical cell, the chloride-storage electrode is electrically coupled to a second electrode (i.e., a counter electrode), such that oxidation and reduction reactions are carried out at the two electrodes when the electrochemical cell is in operation. In order to remove chloride ions from the electrolyte, the bismuth electrode is oxidized to form BiOCl, thereby storing the chloride ions in the bulk of the electrode. Suitable chloride ion-containing electrolyte solutions include salinated water from natural bodies of water, such as seawater, and further include chloride ion-containing wastewaters, such as industrial, municipal, and residential wastewaters.

During the oxidation of the Bi electrode to BiOCl, reduction will occur at the second electrode. The second electrode can be immersed in the same electrolyte solution as the chloride-storage electrode, as in the case of an undivided cell, or it can be immersed in a different electrolyte solution, as in the case of a divided cell in which the two electrolyte solutions are separated by a membrane. Generally, a divided cell will be preferred if the reaction conditions (e.g., temperature and/or pH) or the reactants used for the chlorination/dechlorination at the bismuth electrode would interfere with the complementary redox reactions occurring at the second electrode, or vice versa.

The nature of the second electrode will depend on the type of reduction reaction to be carried out at that electrode during the operation of the electrochemical cell. For example, if the electrochemical cell is to be used for desalination, the second electrode will be a sodium-storage electrode. If the chlorination reaction of the Bi electrode is coupled with hydrogen (H$_2$) generation, the second electrode will be a water reduction electrode, such as a platinum electrode. If the chlorination reaction of the Bi electrode is coupled with oxygen reduction, the second electrode will be an oxygen reduction electrode that reduces the oxygen to, for example, hydroxide ions or hydrogen peroxide.

The BiOCl electrode can be converted back into a Bi electrode by a reduction reaction, where BiOCl is reduced to Bi, thereby releasing chloride ions into the electrolyte (e.g., waste water). The pH condition of the electrolyte may be used (e.g., acidic wastewater) to improve the thermodynamics or kinetics of the dechlorination process and the cycle performance of the Bi/BiOCl electrode, as illustrated in the Example. While reducing BiOCl to Bi in an electrochemical cell, oxidation occurs at the second electrode. The nature of the second electrode will depend on the type of oxidation reaction to be carried out at that electrode during the operation of the electrochemical cell. For example, if the electrochemical cell is to be used for salination, the second electrode will be a sodium-storage electrode that releases sodium ions during oxidation. If the dechlorination of BiOCl is coupled with the oxidation of a metal electrode, the second electrode will be a metal electrode with the desired oxidation potential. Depending on the nature of the oxidation reaction occurring at the second electrode, a divided cell or an undivided cell can be constructed.

A chloride-storage electrode can be coupled with a sodium-storage electrode to construct a rechargeable desalination cell capable of desalinating seawater or brackish water. A sodium-storage electrode is one that can store and release sodium ions ($Na^r$) in the bulk of the electrode structure by reduction (sodiation) and oxidation (desodiation) reactions. In an electrochemical cell, the chloride-storage electrode is electrically coupled to the sodium-storage electrode. During the desalination process of the desalination cell, the chloride storage electrode undergoes oxidation to store chloride ions, while the sodium storage electrode undergoes reduction to store sodium ions. During the salination process, the chloride storage electrode undergoes reduction to release chloride ions, while the sodium storage electrode undergoes oxidation to release sodium ions.

Figure 7A:
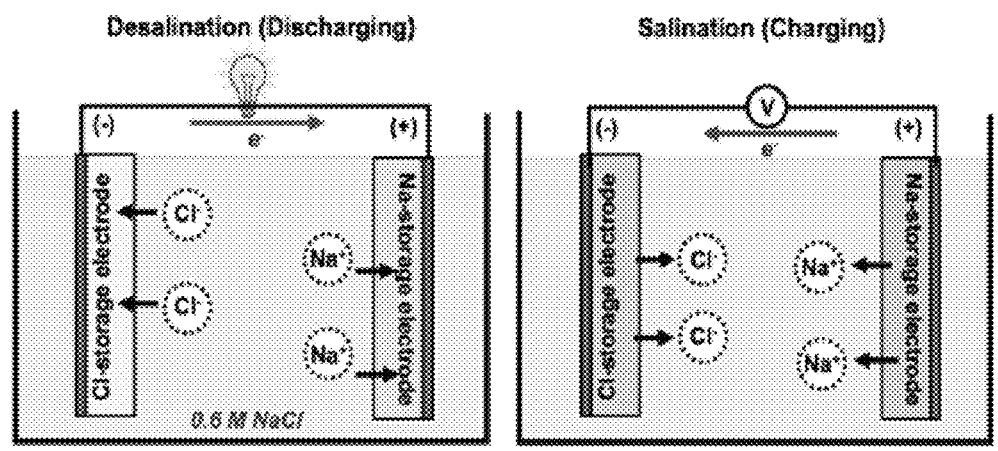
FIG. 7A depicts the operation of a Type 1 desalination cell.
Figure 7B:
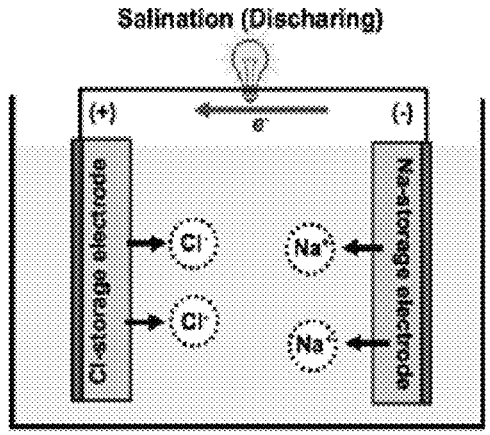
FIG. 7B shows the operation of a Type 2 desalination cell.

Depending on the relative redox potentials of the Na-storage electrode and the Cl-storage electrode, two different types of desalination electrochemical cells (Type 1 and Type 2) can result, Type 2 being illustrated in the Example. The operation of Type 1 and Type 2 cells are illustrated schematically in FIGS. 7A and 7B. If the sodiation/desodiation potential of the Na-storage electrode is more positive than the chlorination/dechlorination potential of the Cl-storage electrode, a Type 1 cell is formed, where desalination occurs spontaneously (discharging) and salination requires an energy input (charging). One example of a sodium-storage electrode for a Type 1 desalination cell is an $MnO_2$ electrode, of the kind described in Pasta et al., *Nano Lett.*, 2012, 12(2), 839-843. Other examples of sodium-storage electrodes for Type 1 electrochemical cells include $Na_{0.44}MnO_2$, $Na_3V_2(PO_4)_3$, $NaVPO_4F$, CuHCF, and NiHCF electrodes. If the sodiation/desodiation potential of the Na-storage electrode is more negative than the chlorination/dechlorination of the Cl-storage electrode, a Type 2 cell is formed, where desalination requires an energy input (charging) and salination generates an energy output (discharging). The energy released during the discharging process recovers at least the part of the energy input during the charging process, reducing the net energy required for the desalination/salination cycle. One example of a sodium-storage electrode for a Type 2 desalination cell is an $NiTi_2(PO_4)_3$ electrode, as described in the Example. Other examples of sodium-storage electrodes for Type 2 electrochemical cells include $Na_2V_6O_{16}$ and $Na_2FeP_2O_7$ electrodes.

Unlike electrodes that store ions only in a surface double-layer, electrodes that store ions in their bulk can be readily removed from one electrolyte solution and transferred to a different electrolyte solution. This is advantageous in embodiments of the desalination cells in which the sodium storage reaction at the second electrode is completed before the chloride storage reaction at the Bi electrode is completed. In this situation, the second electrode can be replaced with a different electrode (a "replacement electrode") that carries out a different reduction reaction, as the oxidation of Bi to BiOCl continues to completely remove chloride ions in the electrolyte. This new reduction reaction can be one that is carried out in the same electrolyte that is in contact with the chloride-storage electrode, or it can be one that is carried out in a separate electrolyte solution. This provides a flexible approach that allows the user to select a reduction reaction that minimizes the energy input needed to dechlorinate the electrolyte solution and/or that allows the user to generate a desired reduction product. By way of illustration, a $NaTi_2(PO_4)_3$ sodium-storage electrode in a Type II desalination cell could be replaced by a hydrogen generation electrode (i.e., an electrode at which water is reduced to $H_2(g)$) once the $NaTi_2(PO_4)_3$ became fully sodiated, as discussed in the Example. Alternatively, electrodes that reduce $O_2$, or toxic metal ions, such as Pb or Hg ions, can be used.

Similarly, if the oxidation of the second electrode (i.e., desodiation of the sodium-storage electrode) during the salination cycle of the desalination cell is completed before the complete dechlorination of the BiOCl in the chloride-storage electrode, the dechlorination of BiOCl can be completed by replacing the second electrode with a different electrode (a "replacement electrode") that carries out a different oxidation reaction until the dechlorination of the BiOCl in the chloride-storage electrode is completed. Here, again, the new oxidation reaction can be carried out in the same electrolyte solution that is in contact with the chloride-storage electrode or a separate electrolyte solution, and can be strategically selected to minimize the energy input needed to operate the cell. For example, in a Type 2 desalination cell, the sodium-storage electrode can be replaced by an electrode that oxidizes at a more negative potential than the sodium-storage electrode that it replaces. By way of illustration, a $NaTi_2(PO_4)_3$ sodium-storage electrode in a Type II desalination cell could be replaced by a zinc electrode once the $Na_3Ti_2(PO_4)_3$ has been fully desodiated, as discussed in the Example. Alternatively, electrodes that remove toxic pollutants from the electrolyte solution via oxidation can be used. For example, an electrode that oxidizes organic molecules, such as dye molecules or benzene to $CO_2$ could be used. Or, an electrode that oxidizes Cl— to $Cl_2(g)$ can be employed.

EXAMPLE

This example reports a nanocrystalline Bi foam electrode as an efficient and high capacity Cl-storage electrode, which stores $Cl^-$ ions in the form of BiOCl. Because both Bi and BiOCl are insoluble in saline aqueous conditions in a wide pH and potential range, a sustainable use of Bi and BiOCl electrodes in seawater is possible. The performance of Bi and BiOCl electrodes was investigated for their half-cell reactions (i.e., chlorination of Bi and dechlorination of BiOCl), and then a desalination cell was constructed where the Bi electrode is paired with $NaTi_2(PO_4)_3$ as a Na-storage electrode. Since both Bi and $NaTi_2(PO_4)_3$ electrodes store salt ions in the bulk of the electrodes, the $Bi/NaTi_2(PO_4)_3$ cell has the capacity to desalinate seawater. By optimizing the desalination and salination conditions, it was demonstrated that the $Bi/NaTi_2(PO_4)_3$ cell achieved desalination with an potential input of 0.75 V and salination with a potential output of 0.55 V when the desalination and salination processes were performed galvanostatically at ±1 mA cm$^{-2}$. This means that the Bi/NaTi$_2$(PO$_4$)$_3$ cell can perform a desalination/salination cycle with a net potential input of only 0.20 V.

Figure 1B:
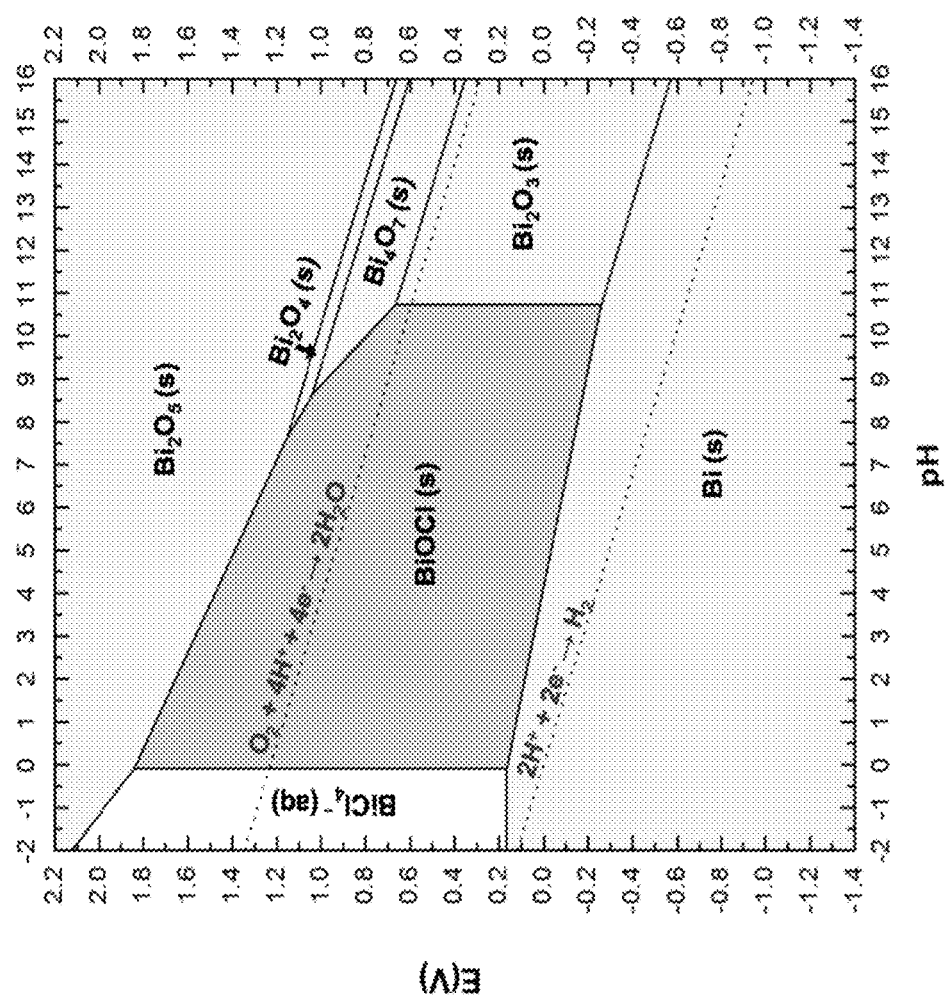
FIG. 1B depicts a Pourbaix diagram for Bi in a 0.6 M solution at 25° C.

The Pourbaix diagram of Bi, which shows the various species of Bi present as functions of pH and potential in a 0.6 M Cl$^-$ solution (the concentration of Cl$^-$ in the seawater) was constructed and compared with that in pure water in FIG. 1(A) and FIG. 1(B) (M. Pourbaix, Atlas of electrochemical equilibria in aqueous solutions (NACE, Houston Tex., ed. 2, 1974), pp. 1-644.) In pure water, the oxidation product of Bi metal is either Bi$_2$O$_3$, if the pH was above 4.5, or Bi$^{3+}$ ions (e.g. Bi$^{3+}$ or Bi$_6$(OH)$_{12}^{6+}$), if the pH is below pH 4.5. However when Cl$^-$ ions are present, oxidation of Bi resulted in the formation of insoluble BiOCl in a wide range of pH conditions (0<pH<10.5).

Unlike CDI, the storage of Cl$^-$ ions by the Bi electrode will require the diffusion of Cl$^-$ ions into the Bi lattice to form a new crystalline phase, BiOCl. In this case, incorporating a porous structure and decreasing the size of the Bi crystals can be highly advantageous as these can increase the interfacial area and facilitate Cl$^-$ diffusion into the Bi lattice, maximizing the amount of Bi that can be converted to BiOCl. Therefore, a high surface area nanocrystalline Bi foam electrode was prepared by electrodeposition to examine the use of Bi as a Cl-storage electrode for use in a desalination cell.

The foam structure of Bi shown in FIG. 2A was obtained by depositing Bi while concurrently reducing water to H$_2$. The H$_2$ bubbles formed on the working electrode served as an in-situ generated template to deposit microporous Bi electrodes. The high magnification scanning electron microscopy (SEM) image shows that the wall of the foam structure is composed of nanoscale needle-like dendrites, contributing further to the increase in the surface area of the electrode (FIG. 2(B)).

The electrochemical behavior of the resulting Bi electrode was first investigated in a 0.6 M NaCl solution, which mimics the NaCl concentration in seawater, using linear sweep voltammetry (LSV). The electrochemical reaction involving the conversion between Bi and BiOCl is shown in eq. 1. If this reaction is conducted in a 0.6 M NaCl solution (pH 6.4), the equilibrium reduction potential is calculated to be −0.088 V vs. SHE using the Nernst equation, which is equivalent to −0.285 V vs. the Ag/AgCl (in 4 M KCl) reference electrode (RE).

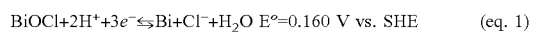

$$BiOCl + 2H^+ + 3e^- \leftrightarrows Bi + Cl^- + H_2O \quad E° = 0.160 \text{ V vs. SHE} \quad (eq. 1)$$

Figure 3A:
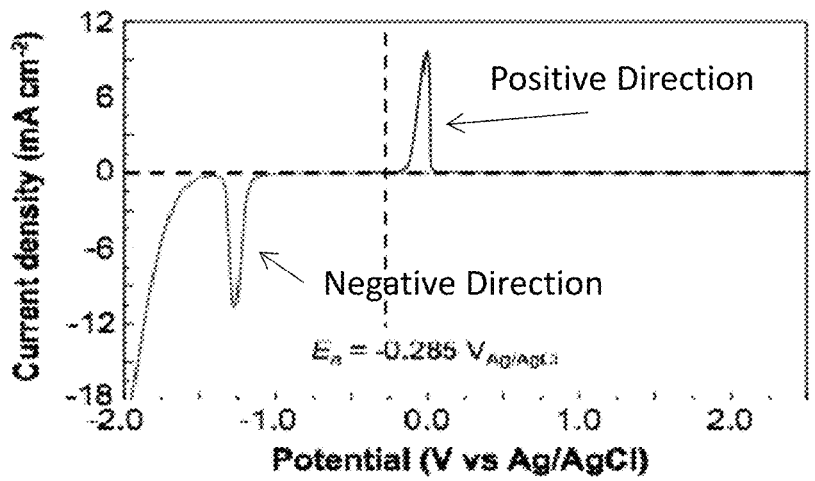
FIG. 3A depicts the electrochemical characterization of Linear Sweep Voltammetry (LSV) of a Bi electrode to the positive direction and to the negative direction (scan rate=5 mV $s^{-1}$).

An LSV scan to the positive direction (FIG. 3(A)) showed the onset of anodic current at approximately −0.15 V vs. Ag/AgCl and an anodic current peak centered at −0.01 V vs. Ag/AgCl. After the oxidation of Bi to BiOCl, no other oxidation reaction such as water oxidation was observed on the BiOCl surface when the potential was scanned to 2.5 V vs. Ag/AgCl (=3.1 V vs. RHE). Since the water oxidation reaction can compete with the Cl$^-$ storage reaction, the fact that BiOCl was completely inert for water oxidation and was oxidatively stable over a wide window of anodic potentials is a great advantage for the use of Bi for the desalination process. An LSV scan to the negative direction (FIG. 3(A)) shows the onset of cathodic current at about −0.45 V vs. Ag/AgCl and a cathodic current peak centered at −1.27 V vs. Ag/AgCl, which is due to the reduction of BiOCl to Bi. After the reduction of BiOCl, an additional cathodic wave, which is due to the reduction of water, follows.

Comparing the anodic and cathodic peak positions with the equilibrium redox potential of Bi/BiOCl, the reduction kinetics of BiOCl to Bi appear to be much more sluggish than the oxidation kinetics of Bi to BiOCl. Considering that redox reactions involving the formation of solid phases are typically much slower than those involved with only solution species, the oxidation kinetics of Bi to BiOCl, requiring only an overpotential of ~100 mV to initiate the oxidation, appears to be quite fast.

The capacities for Bi to store Cl$^-$ ions and for BiOCl to release Cl$^-$ ions were investigated by applying a constant current density (1 mA cm$^{-2}$ for the oxidation of Bi to BiOCl and −1 mA cm$^{-2}$ for the reduction of BiOCl to Bi). The potential changes against the Ag/AgCl RE during these conversion processes were recorded as a function of capacity (FIG. 3(B)). When the oxidation of Bi was initiated, the potential rapidly increased from its open circuit potential and plateaued at −0.08 V vs. Ag/AgCl. When the oxidation reaction was terminated with a cut-off potential of 0.5 V, the total capacity was determined to be 0.2351 mAh cm$^{-2}$. The Bi electrode used in this study contained 1.25±0.21 mg cm$^{-2}$ of Bi, and, therefore, the full conversion of Bi to BiOCl should theoretically require 0.4810 mAh cm$^{-2}$. Comparing the theoretical and observed capacities, 48.9% of the Bi in the Bi electrode was estimated to be electrochemically active. With 48.9% of the Bi being electrochemically active, the amount of Cl that can be stored per 1 g of Bi is calculated to be 82.96 mg. This result is impressive considering that the amount of Cl that can be stored by the CDI system using a porous carbon electrode is estimated to be 16.38 mg per 1 g of carbon (calculation details discussed below). (J. Lee, S. Kim, C. Kim, J. Yoon, Hybrid capacitive deionization to enhance the desalination performance of capacitive techniques, *Energy Environ. Sci.* 7, 3683-3689 (2014).) If 100% Bi becomes electrochemically active by further morphology optimizations, the amount of Cl that can be stored per 1 g of Bi will increase to 169.6 mg.

Figures 4A, 4B:
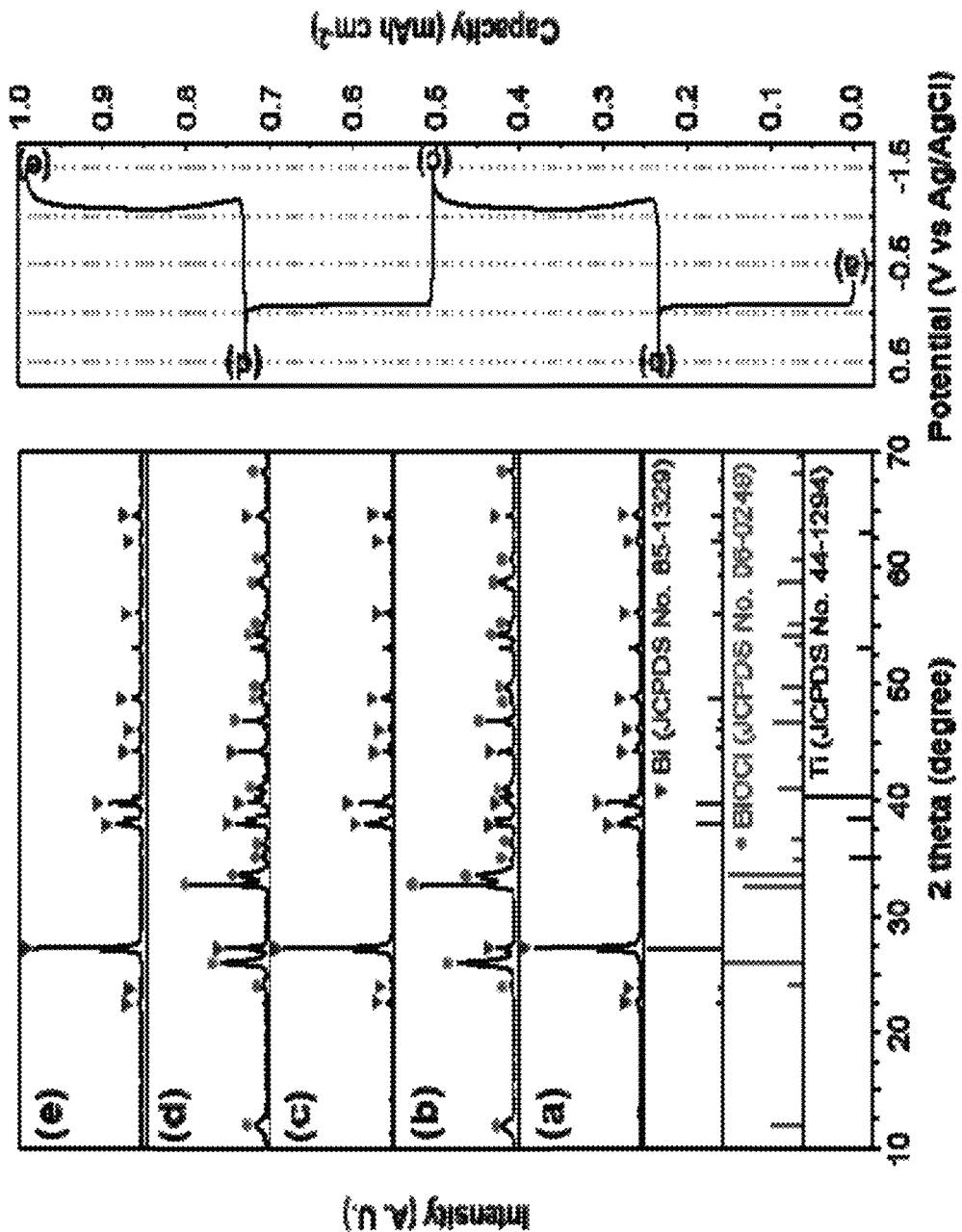
FIG. 4A shows X-ray Diffraction (XRD) patterns for a Bi electrode as-deposited (panel (a)); after the first chlorination (panel (b)); after the first dechlorination (panel (c)); after the second chlorination (panel (d)); and after the second dechlorination (panel (e)).
FIG. 4B shows the capacity-potential plot recorded for each process.

The X-ray diffraction patterns of the as-deposited Bi before and after oxidation at 1 mA cm$^{-2}$ are shown in FIG. 4A, panels (a)-(e). The as-deposited Bi electrode was crystalline and showed peaks generated only by Bi. After oxidation, the intensities of the Bi diffraction peaks were diminished and new peaks, which can be all assigned to peaks for BiOCl, appeared confirming the ability for Bi to store Cl$^-$ as crystalline BiOCl.

Figure 3B:
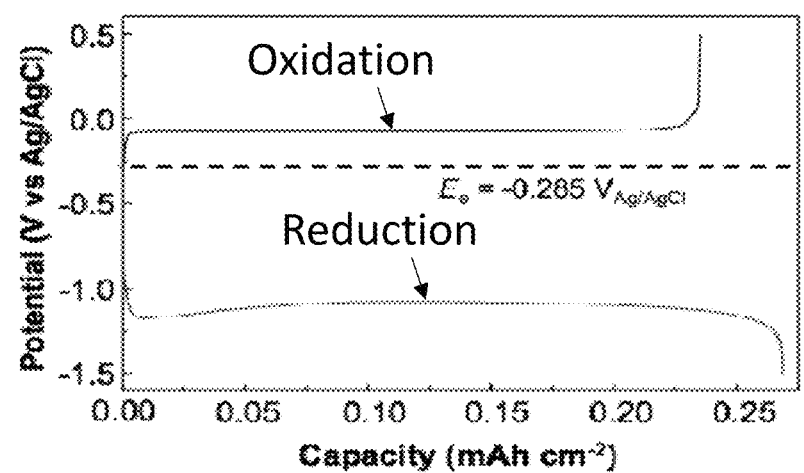
FIG. 3B shows potential profiles of a Bi electrode during galvanostatic oxidation and reduction at ±1 mA $cm^{-2}$ in 0.6 M NaCl.

When reduction of BiOCl was performed at −1 mA cm$^{-2}$, the potential decreased from its open circuit value and plateaued at around −1.15 V--1.2 V vs. Ag/AgCl (FIG. 3(B)). When −1.5 V vs. Ag/AgCl was used as the cut-off potential, the capacity for reduction was determined to be 0.2685 mAh cm$^{-2}$, which is slightly higher than that of oxidation. Since the amount of Cl$^-$ released cannot exceed the amount of Cl$^-$ stored, the observed increase in capacity should be due to the water reduction reaction that occurred simultaneously as a minor side reaction.

When the reduced electrode was examined by XRD, the peaks assigned to BiOCl completely vanished, and the crystallinity of Bi was fully recovered (FIGS. 4A and 4B). The same behavior was observed for an additional redox cycle, indicating that crystalline BiOCl and Bi can be formed repeatedly during the Cl storage/release cycles. The elemental analysis performed on the Bi and BiOCl electrodes during two redox cycles using energy-dispersive X-ray spectroscopy (EDS) (Table 1) agrees well with the XRD results.

TABLE 1

The atomic ratios of the Bi electrode during the first two chlorination/dechlorination cycles obtained by EDS analysis

| Conversion state | Film composition Atomic ratio of Bi:Cl |
|---|---|
| As-deposited | 1:0.043 (±0.005) |
| After 1st Chlorination | 1:0.976 (±0.011) |
| After 1st Dechlorination | 1:0.017 (±0.005) |
| After 2nd Chlorination | 1:0.939 (±0.013) |
| After 2nd Dechlorination | 1:0.020 (±0.005) |

The morphology of the BiOCl electrode obtained by oxidizing Bi at 1 mA cm$^{-2}$ is shown in FIG. 2(C). After oxidation, needle-like Bi dendrites were converted to thin two-dimensional sheets of BiOCl. When BiOCl was reduced back to Bi, the needle-like Bi dendrites reappeared (FIG. 2(D)). The same morphological change was repeated for an additional redox cycle (FIGS. 2(E) and 2(F). The nanocrystalline dendritic Bi morphology that provides ample space between the needle-like nanocrystals of Bi appears to be highly beneficial for the observed cycling ability as it offers sufficient room for individual Bi crystals to become BiOCl sheets, which involves an increase in volume by 158% (calculation details discussed below).

Figure 3C:
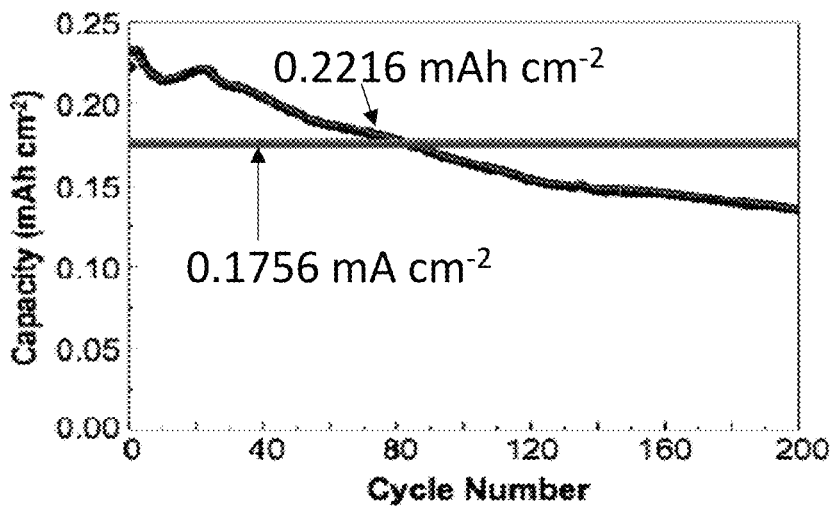
FIG. 3C depicts a cycle test of Bi electrodes using an initial capacity of 0.2216 mAh $cm^{-2}$ and 0.1756 mA $cm^{-2}$ for Cl storage.

The cyclability of the Bi/BiOCl electrode for Cl$^-$ storage and release was evaluated by applying ±2 mA cm$^{-2}$ for 200 cycles. Cut-off potentials of 0.5 V and 1.4 V vs. Ag/AgCl were used for the oxidation and reduction, respectively. FIG. 3(C) shows the capacities measured for Cl$^-$ storage versus cycle number. The initial and the final capacities for Cl$^-$ ion capture were 0.2216 mAh cm$^{-2}$ and 0.1346 mAh cm$^{-2}$, respectively, corresponding to the retention of 60.77% of the initial capacity after 200 cycles. It was postulated that the ~40% reduction in the capacitance is most likely due to the mechanical loss of Bi and BiOCl caused by pulverization. This means that the volume change involved with the conversion of Bi and BiOCl resulted in the disintegration of a portion of the nanoparticles/nano plates from the electrode. In this case, intentionally limiting the amount of Bi that is converted to BiOCl so that the core region of the Bi electrode serving as the "stem" of the dendritic Bi remains as Bi can help to enhance the cyclability of the electrode by retaining the connection between the crystals. This postulation was tested by repeating the cycling test while limiting the capacity for oxidation to 0.1756 mA cm$^{-2}$, which is 80% of the initial capacity of the Cl storage shown in FIG. 3(C). (The potential-capacity plots measured for the first three Cl storage/release cycles can be found in FIGS. 5(A) and 5(B).) The result shows that indeed the initial capacity of 0.1756 mA cm$^{-2}$ was maintained over 200 cycles without any loss, demonstrating that with further morphology optimization that minimizes the pulverization problem, excellent cyclability for higher capacities should be possible.

To demonstrate the use of the Bi electrode for the overall desalination process, the Bi electrode needed to be coupled with a Na-storage electrode. Among a few materials reported in the field of aqueous rechargeable Na batteries, NASICON-type NaTi$_2$(PO$_4$)$_3$ was selected for this study due to its high specific storage capacity of 133 mA h g$^{-1}$ and well-defined and relatively low redox potential of Ti$^{4+}$/Ti$^{3+}$ at approximately −0.8 V (Ag/AgCl), which is coupled with the sodiation/desodiation processes as shown in eq. 2.

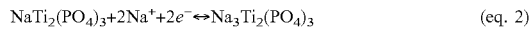
$$NaTi_2(PO_4)_3 + 2Na^+ + 2e^- \leftrightarrow Na_3Ti_2(PO_4)_3 \quad (eq. 2)$$

NaTi$_2$(PO$_4$)$_3$ electrodes used in this study were prepared by a sol-gel method.

Figure 6A:
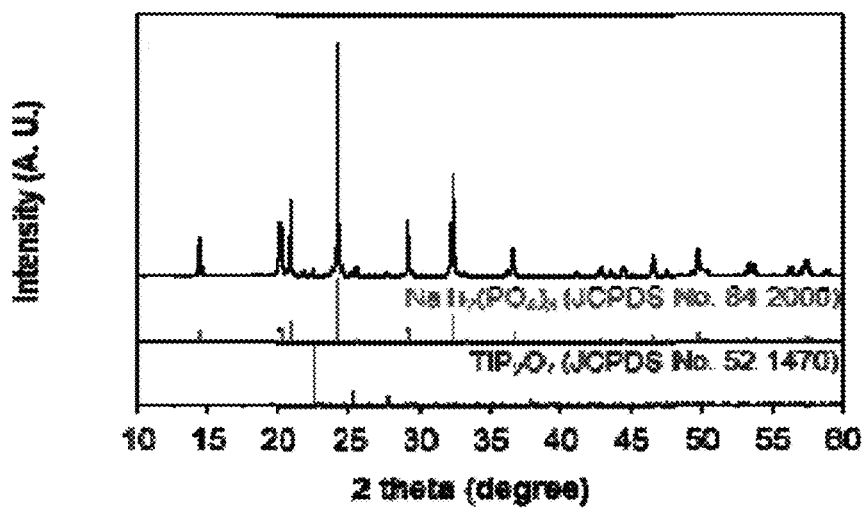
FIG. 6A depicts the XRD pattern for NASICON-type $NaTi_2(PO_4)_3$.

Since it is reported that NaTi$_2$(PO$_4$)$_3$ typically suffers from the low intrinsic electrical conductivity, carbon was coated on NaTi$_2$(PO$_4$)$_3$ through pyrolysis of sucrose. The XRD pattern for the pristine NaTi$_2$(PO$_4$)$_3$ powder confirmed the synthesis of well-crystallized NASICON-type NaTi$_2$(PO$_4$)$_3$ (FIG. 6(A)).

Figure 6B:
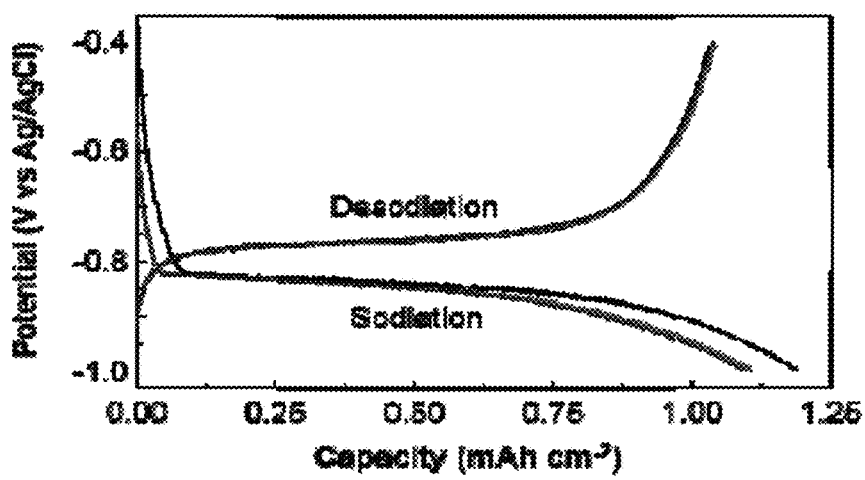
FIG. 6B shows the potential-capacity plots for the first three sodiation/desodiation cycles for the $NaTi_2(PO_4)_3$.
Figure 6C:
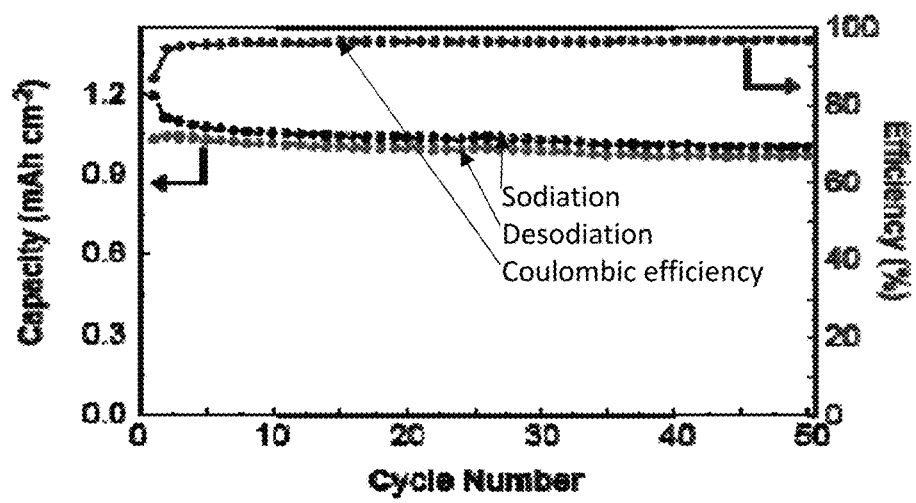
FIG. 6C depicts the cycle performance of the $NaTi_2(PO_4)_3$. The sodiation/desodiation reactions were performed at ±2 mA $cm^{-2}$ in 1 M $Na_2SO_4$ in the potential range of −1.0 to −0.4 V vs. Ag/AgCl.

The sodiation/desodiation profiles of NaTi$_2$(PO$_4$)$_3$ in a 1 M Na$_2$SO$_4$ solution, which is typically used for aqueous rechargeable Na batteries, at a current density of ±2 mA cm$^{-2}$ between −1.0 and −0.4 V vs. Ag/AgCl, are shown in FIG. 6(B). Upon reduction, a plateau at −0.83 V vs. Ag/AgCl was observed, corresponding to the sodiation of NaTi$_2$(PO$_4$)$_3$ accompanied by the reduction of Ti$^{4+}$ to Ti$^{3+}$. Upon the following oxidation, a plateau at −0.78 V vs. Ag/AgCl was achieved, which corresponds to desodiation accompanied by the oxidation of Ti$^{3+}$ to Ti$^{4+}$. The observed behaviors agree well with the typical voltage profiles of NaTi$_2$(PO$_4$)$_3$. (H. Kim, J. Hong, K.-Y. Park, H. Kim, S.-W. Kim, K. Kang, Aqueous Rechargeable Li and Na Ion Batteries, *Chem. Rev.* 114, 11788-11827 (2014); S. I. Park, I. Gocheva, S. Okada, J. Yamaki, Electrochemical properties of NaTi$_2$(PO$_4$)$_3$ anode for rechargeable aqueous sodium-ion batteries, *J. Electrochem. Soc.* 158, A1067-A1070 (2011); Z. Li, D. Young, K. Xiang, W. C. Carter, Y.-M. Chiang, Towards high power high energy aqueous sodium-ion batteries: The NaTi$_2$(PO$_4$)$_3$/Na$_{0.44}$MnO$_2$ system, *Adv. Energy Mater.* 3, 290-294 (2013).) The NaTi$_2$(PO$_4$)$_3$ electrode also showed excellent cycle stability with good capacity retention and Coulombic efficiency (FIG. 6(C)).

After the synthesis and characterization of the NaTi$_2$(PO$_4$)$_3$ electrode, a desalination cell composed of a Bi electrode and a NaTi$_2$(PO$_4$)$_3$ electrode was constructed. Depending on the relative redox potentials of the Na-storage electrode and the Cl-storage electrode, two different types of desalination cells could have resulted. If the sodiation/desodiation potential of the Na-storage electrode was more positive than the chlorination/dechlorination potential of the Cl-storage electrode, desalination would occur spontaneously (discharging), while salination would require an energy input (charging) (FIG. 7(A)), referred to as Type 1 desalination cell. The Ag/MnO$_2$ cell reported previously belongs to this type (9). The energy released during desalination by the Type 1 cell could then be utilized to perform additional work. If the sodiation/desodiation potential of the Na-storage electrode were more negative than the chlorination/dechlorination of the Cl-storage electrode, desalination would require an energy input (charging), while salination would generate an energy output (discharging), which is shown as Type 2 in FIG. 7(B). Once the electrochemical cell was charged by desalination, the energy released during salination could be utilized for any desired work. The Bi/NaTi$_2$(PO$_4$)$_3$ cell constructed in this study was the first example of a Type 2 desalination cell. The overall desalination reaction of the Bi/NaTi$_2$(PO$_4$)$_3$ cell is shown in eq. 3.

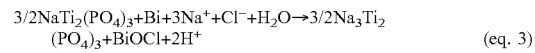
$$3/2 NaTi_2(PO_4)_3 + Bi + 3Na^+ + Cl^- + H_2O \rightarrow 3/2 Na_3Ti_2(PO_4)_3 + BiOCl + 2H^+ \quad (eq. 3)$$

The desalination performance of the Bi/NaTi$_2$(PO$_4$)$_3$ cell was first examined in an undivided cell containing a 0.6 M NaCl solution at a constant current density of 1 mA cm$^{-2}$. While the cell potential between the Bi electrode and the NaTi$_2$(PO$_4$)$_3$ electrode was measured, their individual potentials vs. Ag/AgCl were also recorded, which is useful for understanding the cell performance. The individual potential profiles showed that the anode reaction (Cl-storage) occurred at a more positive potential than the cathode reaction (Na-storage) by ~0.75 V (FIG. 8A), meaning that the overall desalination process required an average potential input of 0.75 V. (For the overall reaction to generate an energy output, the cathode reaction should occur at a more positive potential than the anode reaction.)

Figure 8B:
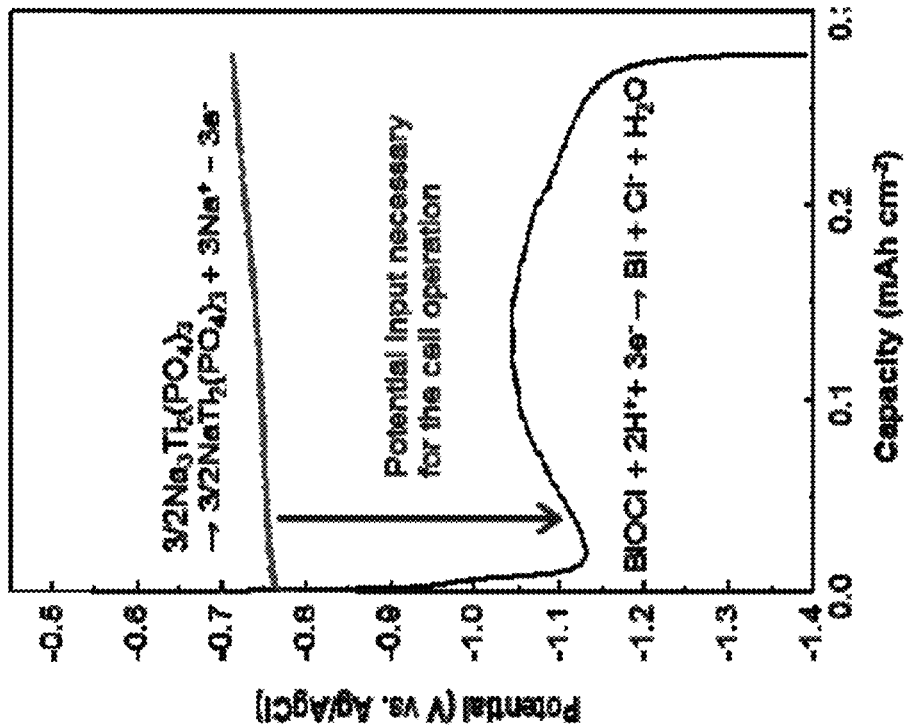
FIG. 8B shows the performance of the Bi/NaTi$_2$(PO$_4$)$_3$ desalination cell with potential-capacity plots at ±1 mA cm$^{-2}$ of BiOCl and Na$_3$Ti$_2$(PO$_4$)$_3$ during the salination process in 0.6 M NaCl.
Figure 8A:
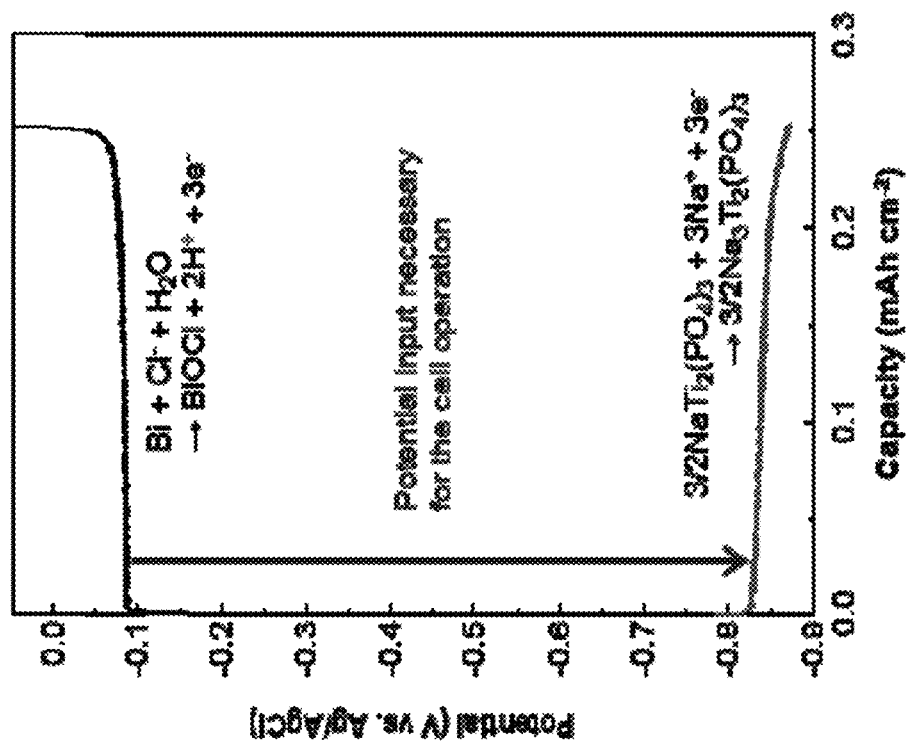
FIG. 8A depicts the performance of a Bi/NaTi$_2$(PO$_4$)$_3$ desalination cell with potential-capacity plots at ±1 mA cm$^{-2}$ of Bi and NaTi$_2$(PO$_4$)$_3$ measured vs. Ag/AgCl during the desalination process in 0.6 M NaCl (pH 6.4).

FIG. 8(B) shows the individual potential profiles of the BiOCl and $Na_3Ti_2(PO_4)_3$ electrodes measured vs. Ag/AgCl during the salination process in the same solution at 1 mA $cm^{-2}$. Thermodynamically, since the desalination process is non-spontaneous, its reverse reaction, the salination process, should be spontaneous. However, as discussed earlier, the reduction of BiOCl to Bi in 0.6 M NaCl is kinetically very sluggish and requires a significant over-potential. As a result, the reduction of BiOCl occurs at a more negative potential than the oxidation of $Na_3Ti_2(PO_4)_3$, thus again requiring an energy input for the salination process.

In order to recover energy during the salination process, the possibility of improving the reduction kinetics of BiOCl by changing solution compositions was examined. It should be noted that while seawater is used as the feed water for the desalination process for seawater desalination, solutions other than seawater (e.g., waste water) can be used for the salination process if they can improve the thermodynamics or kinetics of the salination process and the overall cycle performance. For the CDI systems, which require electrodes to remain immersed in solution between desalination and the salination to not lose salt ions stored in the electrical double layer, altering solutions for the desalination and salination processes may add difficulty to preventing contamination of the desalinated water. However, electrodes used in desalination cells, which store the salt ions in the bulk of the electrode, can be lifted out of the desalinated water after desalination and immersed into a different solution for salination without affecting the salt storage. This will provide more flexibility in the design and operation of desalination/salination systems.

Figure 7C:
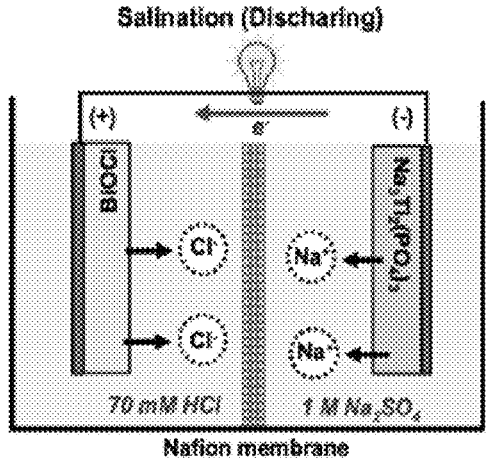
FIG. 7C depicts the operation of a Bi/NaTi$_2$(PO$_4$)$_3$ desalination cell, as described in the Example.
Figure 9A:
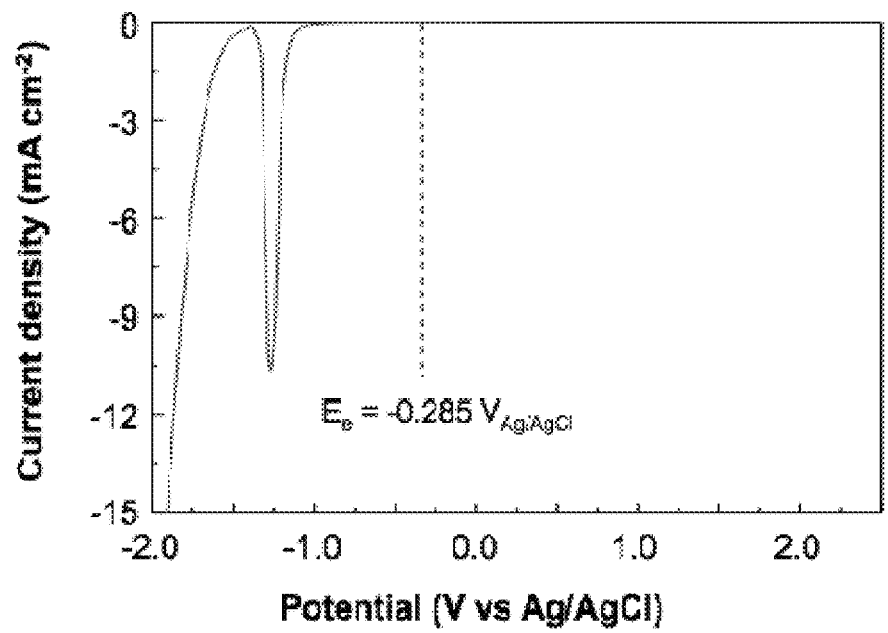
FIG. 9A shows LSV for the reduction of BiOCl in a 0.6 M NaCl solution (pH 6.4).
Figure 9B:
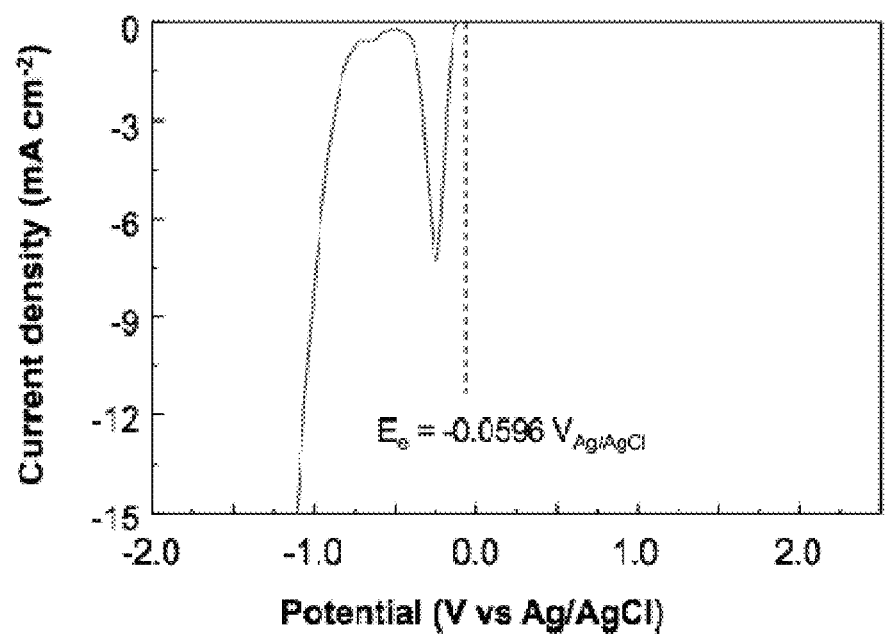
FIG. 9B depicts the LSV for the reduction of BiOCl in a 70 mM HCl solution (pH 1.15). A scan rate of 5 mV s$^{-1}$ was used.

It was discovered that the reduction kinetics of BiOCl could be improved significantly in acidic media (pH<2). In this study, a 70 mM HCl solution (pH 1.15), which can be replaced with acidic wastewater in practice, was chosen as an example solution to carry out reduction of BiOCl with improved kinetics (FIG. 9(B)). The LSV for the reduction of BiOCl in 006 M NaCl (pH=6.4) is shown in FIG. 9(A) for comparison. The use of acidic solution, however, is not favorable for desodiation of $Na_3Ti_2(PO_4)_3$ due to its self-discharge reaction where $Na_3Ti_2(PO_4)_3$ is spontaneously oxidized by reducing water (16). Therefore, salination was performed in a divided cell where the reduction of BiOCl was performed in a 70 mM HCl solution, while the oxidation of $Na_3Ti_2(PO_4)_3$ was performed in a 1 M $Na_2SO_4$ solution, which is the solution used for aqueous sodium ion batteries, thus ensuring the best cycle performance. A Nafion membrane was used as a divider. The operating condition for the $Bi/NaTi_2(PO_4)_3$ cell is summarized in FIG. 7C.

Figure 8C:
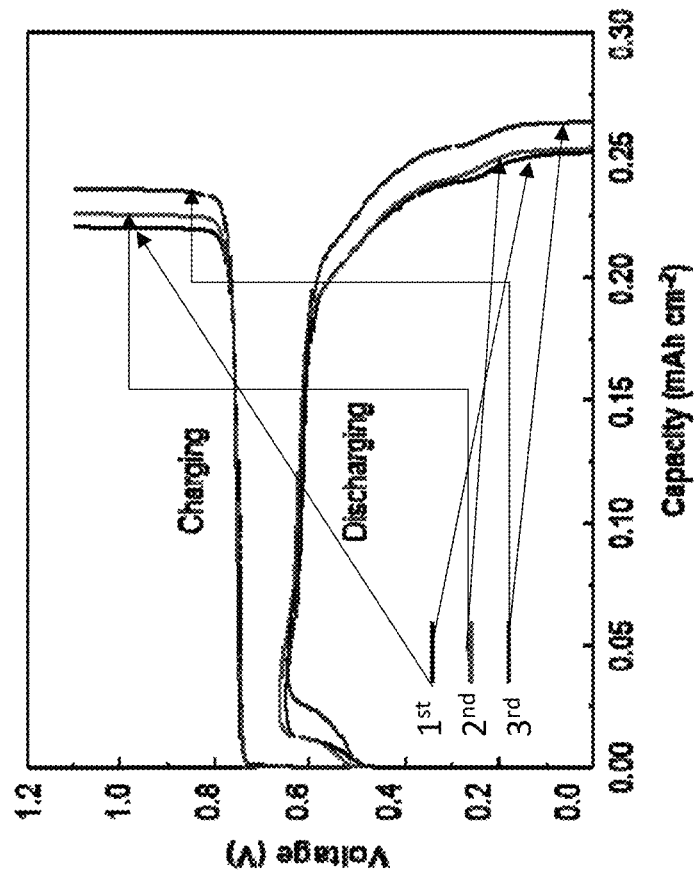
FIG. 8C depicts the performance of the Bi/NaTi$_2$(PO$_4$)$_3$ desalination cell with potential-capacity plots at ±1 mA cm$^{-2}$ of BiOCl in 70 mM HCl (pH 1.15) and Na$_3$Ti$_2$(PO$_4$)$_3$ in 1 M Na$_2$SO$_4$ during the salination process.

FIG. 8(C) shows the potential profiles of the BiOCl and the $Na_3Ti_2(PO_4)_3$ electrodes for salination in a divided cell. The desodiation potential of the $Na_3Ti_2(PO_4)_3$ in 1 M $Na_2SO_4$ vs. Ag/AgCl is comparable to that in 0.6 M NaCl. However, the potential required for dechlorination of BiOCl is changed from $-1.25$ V to $-0.15$ V when a 0.6 M NaCl solution is replaced with 70 mM HCl solution. The difference in the equilibrium potential for the reduction of BiOCl to Bi in these two solutions is only 222 mV. This means that the over-potential to achieve 1 mA $cm^{-2}$ is reduced by 878 mV by using a 70 mM HCl solution. As a result, dechlorination occurs at a more positive potential than desodiation in the divided cell, and the overall salination process can generate an average potential output of 0.55 V.

Figure 8D:
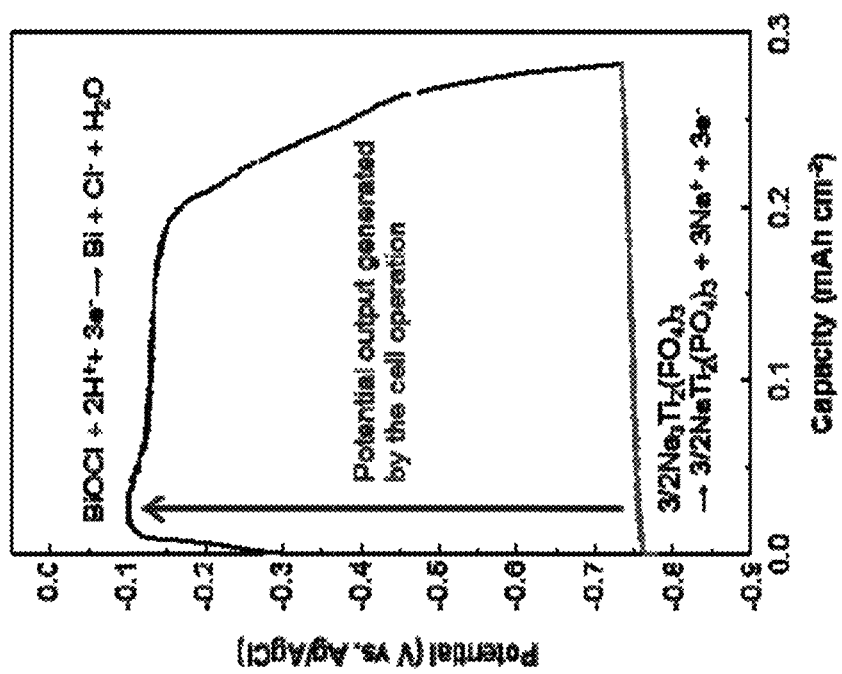
FIG. 8D shows cell voltage-capacity plots during the first three charging-discharging cycles using the operating conditions shown in FIG. 7C.
Figure 8E:
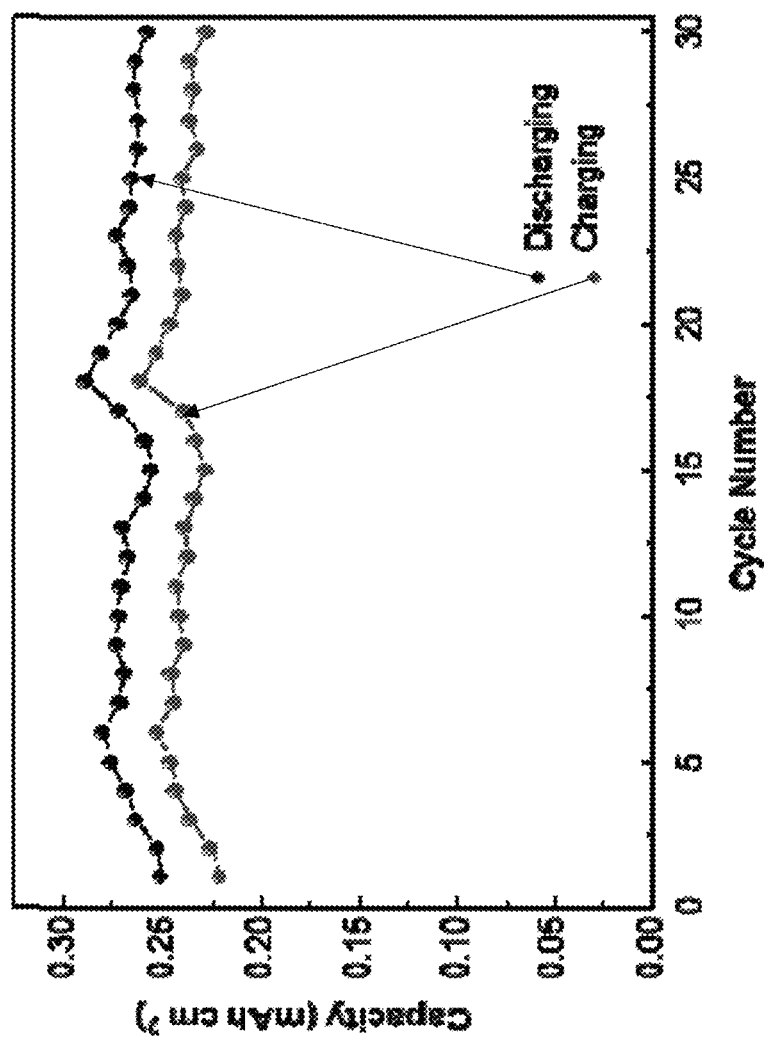
FIG. 8E shows a cycle test of the Bi/NaTi$_2$(PO$_4$)$_3$ cell at ±1 mA cm$^{-2}$ using the operating conditions shown in FIG. 7C.

The cell voltage change of the $Bi/NaTi_2(PO_4)_3$ cell as a function of the capacity during the first three desalination/salination cycles at ±1 mA $cm^{-2}$ is shown in FIG. 8(D). As expected from the results shown in FIG. 8(C), the $Bi/NaTi_2(PO_4)_3$ system requires an average potential input of 0.75 V for desalination (equivalent to 0.175 mWh $cm^{-2}$) and generates an average cell voltage of 0.55 V for salination (equivalent to 0.147 mWh $cm^{-2}$). This means that only a net potential of 0.2 V is required per desalination/salination cycle at ±1 mA $cm^{-2}$ (equivalent to 0.028 mWh $cm^{-2}$). The $Bi/NaTi_2(PO_4)_3$ cell showed excellent cycle performance with negligible changes for both the charging and discharging capacities after 30 cycles (FIG. 8(E)). The minor fluctuation in capacity shown in the cycle test is due to our procedure that involves manually lifting and immersing the Bi and $NaTi_2(PO_4)_3$ electrodes in two different solutions repeatedly. The reason the discharging capacity is slightly higher than the charging capacity is again due to the $H_2$ evolution occurring at the BiOCl electrode as a side reaction during salination.

Figure 10B:
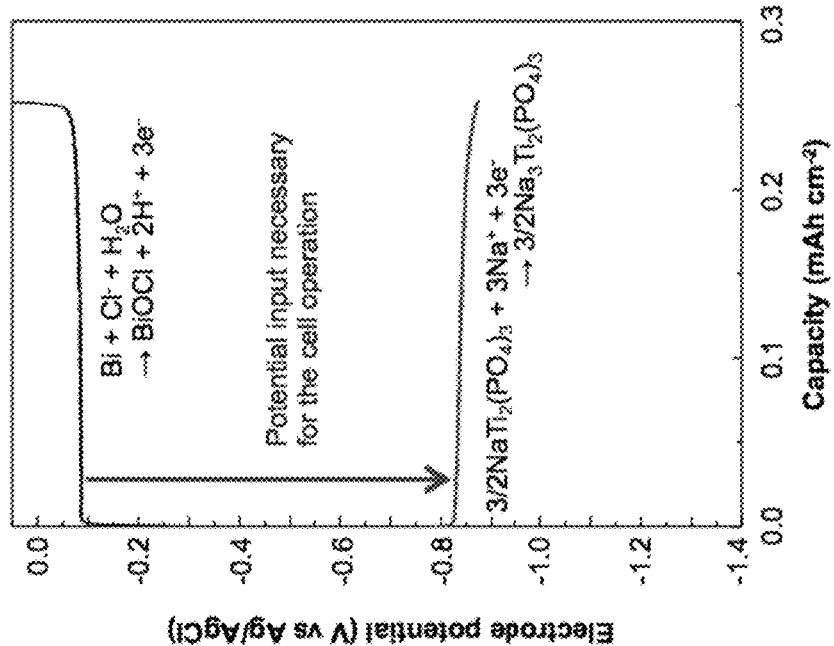
FIG. 10B shows the potential-capacity plots of the Bi electrode performing chlorination in 70 mM HCl and the NaTi$_2$(PO$_4$)$_3$ electrode performing sodiation in 1 M Na$_2$SO$_4$ during charging.
Figure 10A:
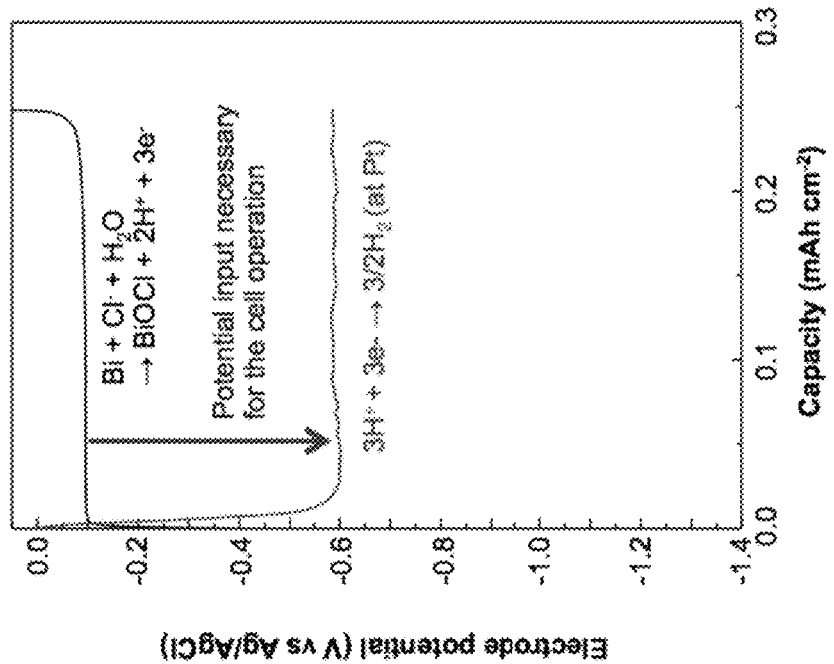
FIG. 10A shows the potential-capacity plots of a Bi electrode performing chlorination and a Pt electrode performing H$_2$ evolution in 70 mM HCl during charging. For comparison.
Figure 10D:
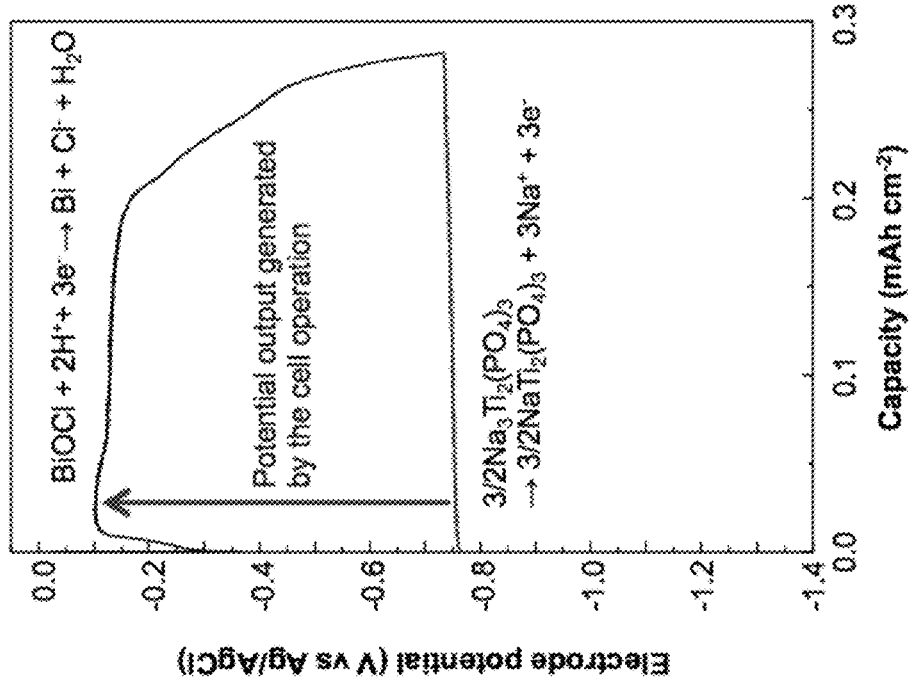
FIG. 10D shows the potential-capacity plots of the BiOCl electrode performing dechlorination in 70 mM HCl and the Na$_3$Ti$_2$(PO$_4$)$_3$ electrode performing desodiation in 1 M Na$_2$SO$_4$ during discharging. All charging and discharging processes were performed galvanostatically at ±1 mA cm$^{-2}$.
Figure 10C:
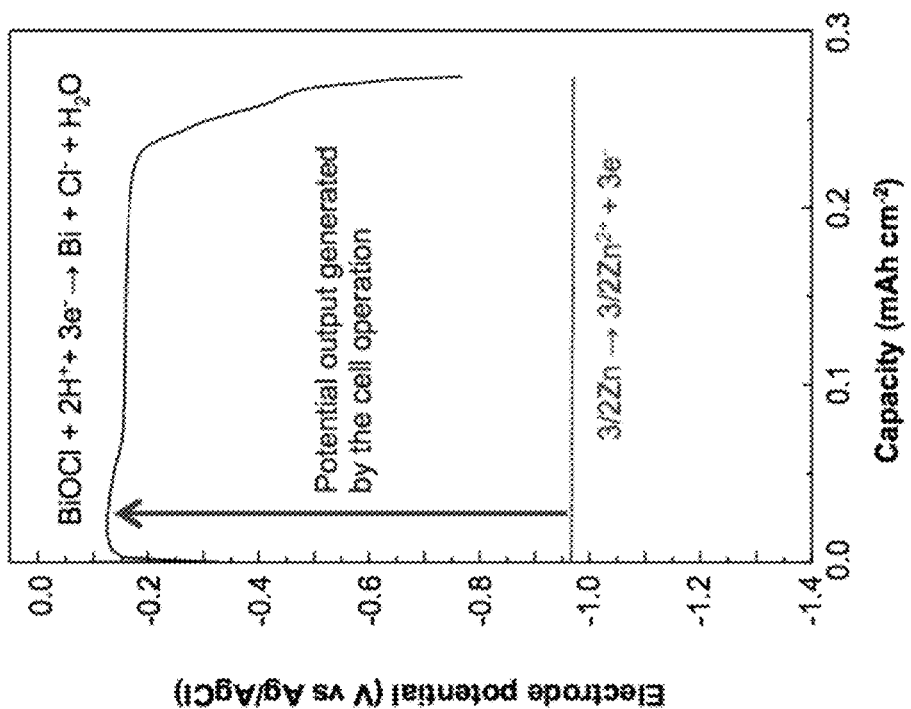
FIG. 10C depicts the potential-capacity plots of the BiOCl electrode performing dechlorination and the Zn electrode being oxidized in 70 mM HCl during discharging. For comparison.

It should be noted that the molar ratio of the $Na^+$ and $Cl^-$ ions stored in the $Bi/NaTi_2(PO_4)_3$ cell during desalination is not 1:1 but 3:1 (eq. 3). This is because while the $NaTi_2(PO_4)_3$ electrode stores one Na per electron, the Bi electrode stores one Cl per three electrons (eq. 1). In a practical sense, this means that during desalination when $Na^+$ in the seawater is completely removed, 2/3 of the $Cl^-$ would still remain in the solution. However, this issue can be resolved by replacing a fully charged $Na_3Ti_2(PO_4)_3$ electrode with an electrode that can perform water reduction to generate $H_2$, a valuable fuel, while Bi finishes removing the remaining $Cl^-$ ions. The evolution of $H_2$ will also remove $H^+$ introduced to the solution during the oxidation of Bi to BiOCl (eq. 1), bringing the pH of the desalinated water back to a neutral range. Preliminary results using Pt as the hydrogen evolution electrode, which can be replaced with an inexpensive alternative for practical cell operation, showed that the potential required to pair the chlorination of Bi and $H_2$ evolution (~0.5 V) was smaller than the potential required for the chlorination of Bi and sodiation of $NaTi_2(PO_4)_3$ (FIGS. 10(A) and 10(B)). This potential was also much smaller than the potential required to produce $H_2$ by water splitting (>1.23 V). In the same manner, if desodiation of $Na_3Ti_2(PO_4)_3$ were completed before dechlorination of BiOCl during salination, dechlorination of BiOCl could be completed by introducing a sacrificial anode reaction, such as oxidation of zinc, which occurs at a more negative potential than desodiation of $Na_3Ti_2(PO_4)_3$ and thus further increases the potential output (FIGS. 10(C) and 10(D)). The zinc ions released into the solution could be recovered by electrochemical deposition of zinc paired with oxidation of $Cl^-$ ions to $Cl_2$, for example. In other words, the desalination/salination cell could be strategically integrated with various electrochemical processes to maximize the useful outcomes (e.g., fresh water, energy output, $H_2$, and $Cl_2$) while minimizing the energy input required for the overall process.

In summary, Bi was demonstrated to be a practical and sustainable high capacity Cl-storage electrode through the use of its conversion to BiOCl. When coupled with $NaTi_2(PO_4)_3$, a new type of a desalination cell that charges by desalination and discharges by salination was constructed, which enabled the desalination/salination cycle at ±1 mA $cm^{-2}$ with a net average potential input of only 0.2 V.

Materials and Methods

Synthesis and Characterization.

The Bi electrodes used in this study were prepared by electrodeposition. A three-electrode setup composed of a Ti sheet as the working electrode, a Pt sheet as the counter electrode, and a saturated calomel electrode (SCE) as the reference electrode were used for deposition in an undivided cell. An aqueous solution containing 14 mM $BiCl_3$ (Alfa Aesar), 1.4 M HCl (Sigma-Aldrich, 37%), and 2.5 g/L polyethylene glycol (PEG) 6000 (USB Corporation) was used as a plating solution. Cathodic deposition ($Bi^{3+}+3e^-\rightarrow Bi$, $E°=0.286$ V vs. SHE) was carried out potentiostatically at −2.6 V vs. SCE for 2 min. The distance between the working electrode and the counter electrode was 2 cm, and the solution was magnetically stirred at 300 rpm. The average current density was approximately −800 mA $cm^{-2}$. After deposition, Bi electrodes were rinsed with distilled water and dried in air. Since vigorous water reduction occurred concurrently with Bi electrodeposition, the amount of Bi deposited could not be determined by the total charge passed assuming 100% Faradaic efficiency for Bi deposition. Therefore, the actual loading of Bi was measured from the weight difference of the working electrode before and after the electrodeposition of Bi, which was 1.25±0.21 mg $cm^{-2}$.

$NaTi_2(PO_4)_3$ was prepared by a sol-gel method following the procedure reported in a previous study. (S. I. Park, I. Gocheva, S. Okada, J.-i. Yamaki, Electrochemical properties of $NaTi_2(PO_4)_3$ anode for rechargeable aqueous sodium-ion batteries, *J. Electrochem. Soc.* 158, A1067-A1070 (2011).) A 0.02 M titanium butoxide solution was first prepared by dissolving titanium butoxide ($C_{16}H_{36}O_4Ti$, Sigma-Aldrich) in a solution composed of 280 mL hydrogen peroxide ($H_2O_2$, 30% solution) and 120 mL ammonium hydroxide ($NH_4OH$, 28-30% $NH_3$ basis) while stirring. Citric acid was added to this solution to achieve a 0.04 M citric acid solution. Stoichiometric amounts of ammonium phosphate monobasic ($NH_4H_2PO_4$, Sigma-Aldrich) and sodium carbonate ($Na_2CO_3$, Macron) to react with Ti in the titanium butoxide solution to form $NaTi_2(PO_4)_3$ were calculated and dissolved in 80 mL DI water and in 100 mL nitric acid ($HNO_3$, 70%), respectively. Then, these solutions were combined with the titanium butoxide solution. The combined solution was stirred at 80° C. for 10 h, and then dried at 140° C. for 2 h to obtain a yellow powder. The resulting powder was annealed at 800° C. for 12 h (ramping rate, 2° C. $min^{-1}$) in air to obtain highly crystalline $NaTi_2(PO_4)_3$ powders. The carbon coating of $NaTi_2(PO_4)_3$ to form $NaTi_2(PO_4)_3$/C composites was achieved via ethylene glycol (EG) assisted pyrolysis of sucrose. For this treatment, 25 mg of sucrose ($C_{12}H_{22}O_{11}$, Sigma-Aldrich) was dissolved in a mixture of 2 mL DI water and 0.5 mL EG, and then 0.5 g of the synthesized $NaTi_2(PO_4)_3$ powder was dispersed in the solution by ultrasonication for 30 min. After drying at 40° C. for 30 min, the resulting gray powder was annealed at 700° C. (ramping rate, 5° C. $min^{-1}$) in an $N_2$ atmosphere for 2 hours. To fabricate the $NaTi_2(PO_4)_3$ electrodes, 70 wt. % $NaTi_2(PO_4)_3$/C powder, 20 wt. % carbon black (Alfa Aesar) and 10 wt. % polytetrafluoroethylene (Sigma-Aldrich) were mixed with Nmethyl-2-pyrrolidone (NMP). After thorough mixing, the paste was kneaded and pressed to prepare sheet-type electrodes with a thickness of ~120 μm. The fabricated electrodes were kept at 80° C. for 10 h to remove the remaining solvent. After drying, the sheet was punched into a disc shape with a 1 $cm^2$ area, then pressed onto the graphite current collector.

The surface morphology and crystal structures of the materials were examined by scanning electron microscopy (SEM) (a LEO 1530 at an accelerating voltage of 5 kV) and powder X-ray diffraction (XRD) (Broker D8 Advanced PXRD, Ni-filtered Cu Kα radiation, λ=1.5418 Å) at room temperature. The composition of the electrode was analyzed by energy-dispersive X-ray spectroscopy (EDS) (Noran System Seven, Thermo Fisher) at an accelerating voltage of 15 kV. To investigate the phase and morphological changes of the electrodes after oxidation and reduction, ex-situ SEM analysis and ex-situ XRD analysis were performed.

Electrochemical Experiments.

Linear sweep voltammetry (LSV) and galvanostatic charging/discharging tests for half-cell reactions (i.e., chlorination/dechlorination of Bi and sodiation and desodiation of $NaTi_2(PO_4)_3$) were performed using a three-electrode setup with an undivided cell. Either a Bi electrode or an $NaTi_2(PO_4)_3$ electrode was used as the working electrode with a Pt sheet as the counter electrode and a Ag/AgCl (4M KCl) electrode as the reference electrode. A scan rate of 5 mV $s^{-1}$ was used.

The desalination and salination performances of the $Bi/NaTi_2(PO_4)_3$ cell were examined in an undivided cell containing a 0.6 M NaCl (Macron) solution. The salination performance was also examined in a divided cell containing a 70 mM HCl solution (pH 1.15) for the BiOCl electrode and a 1 M $Na_2SO_4$ solution for the $Na_3Ti_2(PO_4)_3$ electrode. The two compartments were separated by a Nafion membrane (Nafion N-117, Fuel cell store).

The desalination and the salination performances of the cells were tested galvanostatically at ±1 mA $cm^{-2}$. During these processes, in addition to measuring the cell voltage between the Bi and the $NaTi_2(PO_4)_3$ electrodes as a function of capacity, the individual potentials of the Bi and the $NaTi_2(PO_4)_3$ electrodes against the Ag/AgCl reference electrode were recorded. (When a divided cell was used, the reference electrode was placed in a 1 M $Na_2SO_4$ solution.) The charging process was performed until the cell voltage reached 1.1 V, and the discharging process was performed until the cell voltage reached 0 V. When different solutions were used for the charging/discharging processes, after the charging was finished, the Bi electrode and $NaTi_2(PO_4)_3$ electrode were manually lifted from an undivided cell, rinsed with DI water, and brought into a divided cell for the discharging process.

As mentioned above, the discharging capacity for the Bi electrode is always higher than its charging capacity due to water reduction that occurs as a side reaction during discharging. Therefore, for the cycle test of the $Bi/NaTi_2(PO_4)_3$ cell, it was necessary to use a $NaTi_2(PO_4)_3$ electrode that has a much higher charging/discharging capacity than that of Bi so that the discharging capacity due to the water reduction at the BiOCl electrode can be compensated for by the excess discharging capacity of $Na_3Ti_2(PO_4)_3$. The initial charging capacity of the $NaTi_2(PO_4)_3$ electrode used in this study was 1.1 mAh $cm^{-2}$ while the initial charging capacity of the Bi electrode was 0.23 mAh $cm^{-2}$. Before the cycle test shown in FIG. 8(E), the $NaTi_2(PO_4)_3$ electrode was fully sodiated in 1 M $Na_2SO_4$ and the Bi electrode was fully chlorinated in 0.6 M NaCl separately. The two electrodes were then discharged together in a divided cell. The $Na_3Ti_2(PO_4)_3$ electrode discharged together with BiOCl still contained a significant amount of $Na_3Ti_2(PO_4)_3$, which can be used to compensate for over 100% Coulombic efficiency of the Bi electrode during the cycle test. After this initial charge/discharge process, the $Bi/NaTi_2(PO_4)_3$ cell was used for the cycle test shown in FIG. 8(E). During the cycle test, when necessary, NaTi$_2$(PO$_4$)$_3$ was additionally charged to compensate for over 100% Coulombic efficiency of the Bi electrode for the remaining cycle test.

Calculation Details

Construction of Pourbaix Diagram for the Bi—Cl—H$_2$O System.

Using the ΔG$_f^\circ$ values for all soluble and insoluble species for the Bi—Cl—H$_2$O system, equilibrium potentials for all possible electrochemical reactions, as well as the solubilities of various solution species at 25° C., were calculated. Using this data, the Pourbaix diagram was constructed using Chesta software (FIGS. 1(A) and 1(B)). The activity coefficients for all species were assumed to be 1.

Volume Expansion of Bi During Cl$^-$ Storage Process (Phase Transition to BiOCl):

Unit cell volume of rhombohedral Bi:
(a=4.54 Å, b=4.54 Å, c=11.86 Å, α=90°, β=90° γ=120°)

$V_{unit\,cell}$=4.54 Å*4.54 Å*√3/2*11.86 Å=211.703 Å$^3$

Since there are 6 Bi atoms per unit cell, $V_{unit\,cell}$/atom$_{Bi}$=211.703 Å$^3$/6=35.283 Å$^3$ Unit cell volume of tetragonal BiOCl:
(a=3.89 Å, b=3.89 Å, c=7.37 Å, α=90°, β=90° γ=90°)

$V_{unit\,cell}$=3.89 Å*3.89 Å*7.37 Å=111.524 Å$^3$

Since there are 2 Bi atoms per unit cell, $V_{unit\,cell}$/atom$_{Bi}$=111.524 Å$^3$/2=55.762 Å$^3$ Therefore, the volume change of Bi during a phase transition to BiOCl is 158%.

Calculation of Equilibrium Redox Potentials for Bi/BiOCl:

BiOCl+2H$^+$+3e$^-$⇌Bi+Cl$^-$+H$_2$O

Standard reduction potential:

E°=0.160 V vs. SHE, which is equivalent to −0.0372 V vs. Ag/AgCl (4M KCl)

Equilibrium potential in 0.6 M NaCl (pH 6.4):

$$E = E° - \frac{0.0591\,V}{n}\log a_{Cl^-} + 2\left(\frac{0.0591\,V}{n}\right)\log[H^+]$$
$$= E° - 0.0197\,V(\log a_{Cl^-}) - 0.0394\,V(pH)$$
$$= E° - 0.0197\,V \log(0.6) - 0.0394\,V(6.4)$$
$$= 0.160\,V + 0.00437\,V - 0.25216\,V$$
$$= -0.088\,V\,vs.\,SHE$$

or −0.285 V vs. Ag/AgCl

Equilibrium potential in 70 mM HCl (pH 1.15):

$$E = E° - \frac{0.0591\,V}{n}\log a_{Cl^-} + 2\left(\frac{0.0591\,V}{n}\right)\log[H^+]$$
$$= E° - 0.0197\,V(\log a_{Cl^-}) - 0.0394\,V(pH)$$
$$= E° - 0.0197\,V \log(0.07) - 0.0394\,V(1.15)$$
$$= 0.160\,V + 0.02275\,V - 0.04531\,V$$
$$= -0.13744\,V\,vs.\,SHE$$

or −0.0596 V vs. Ag/AgCl

Capacity of Bi for Cl Storage.

When assuming complete conversion of Bi to BiOCl by the following reaction:

Bi+Cl$^-$+H$_2$O→BiOCl+2H$^+$+3e$^-$ since one mole of Cl (MM=35.453 g/mol) can be stored per one mole of Bi (MM=208.9804 g/mol), the theoretical capacity of Cl storage in 1 g of Bi is calculated to be 169.6 mg/g$_{Bi}$. Storing one mole of Cl in one mol of Bi requires three moles of e$^-$, which is equivalent to 289, 455 C. Since Bi electrodes used in this study contain 1.25 mg of Bi (5.98×10$^{-6}$ mol), the total charge necessary to completely convert Bi to BiOCl is calculated to be:

Theoretical charge required to convert 1.25 mg of Bi to BiOCl=5.98×10$^{-6}$ mol$_{Bi}$×289,455 C/mol$_{Bi}$=1.73 C However, the total charge experimentally observed to convert 1.25 mg of Bi to BiOCl was 0.2351 mAh, which is equivalent to 0.846 C. This means that during chlorination, only 48.9% of the Bi (0.611 mg) in the Bi electrode is electrochemically active and was converted to BiOCl. Therefore, although the theoretical capacity for Cl that can be stored in 1 g of Bi is 169.6 mg/g$_{Bi}$, the experimental capacity for Cl storage that is stored in 1 g of Bi using the Bi electrodes used in this study is calculated to be 82.9 mg/g$_{Bi}$ (=169.6 mg/g$_{Bi}$×48.9%).

Capacity for Cl Storage by CDI.

The capacity for Cl storage of CDI can be calculated from its capacity for NaCl storage reported in the previous study, which is 13.5 mg/g$_{carbon}$. (J. Lee, S. Kim, C. Kim, J. Yoon, Hybrid capacitive deionization to enhance the desalination performance of capacitive techniques, *Energy Environ. Sci.* 7, 3683-3689 (2014).) Assuming that the activated carbon electrodes used for the Na capture and the Cl capture have the same mass and surface area, the capacity of storing 13.5 mg of NaCl in 1 g of carbon is equivalent to storing 8.18 mg of Cl in 0.5 g of carbon and 5.32 mg of Na in 0.5 g of carbon. Therefore, the capacity for Cl storage can be calculated to be 16.36 mg/g$_{carbon}$.

The as-deposited Bi electrode contains a trace amount of Cl, suggesting that it contains a trace amount of BiOCl, although BiOCl peaks were not detected by the XRD of the as-deposited Bi electrode. Deposition of BiOCl during deposition of Bi is possible because the plating solution used for Bi deposition contained Cl$^-$ ions as well as Bi$^{3+}$ ions. The concurrent H$_2$ evolution during Bi deposition can increase the local pH at the WE surface, decreasing the solubility of Bi$^{3+}$ and triggering the precipitation of BiOCl.

After the 1$^{st}$ chlorination, the Bi:Cl ratio is ~1:1 confirming the formation of BiOCl. A slightly higher Bi content than 1:1 is due to the presence of electrochemically inactive Bi present underneath BiOCl. After the 1$^{st}$ dechlorination, the content of Cl$^-$ became negligible, confirming the full conversion of BiOCl to Bi. The same behavior was observed for the 2$^{nd}$ cycle.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for removing chloride ions from an electrolyte solution using an electrochemical cell comprising: a chloride-storage electrode comprising bismuth metal; an electrolyte solution comprising chloride ions in contact with the chloride-storage electrode; a second electrode in electrical communication with the chloride-storage electrode; and an electrolyte solution in contact with the second electrode, wherein the electrolyte solution in contact with the second electrode is either the electrolyte solution comprising chloride ions that is in contact with the chloride-storage electrode or a different electrolyte solution, the method comprising:
generating a flow of electrons from the chloride-storage electrode to the second electrode, whereby bismuth in the chloride-storage electrode is oxidized to form BiOCl and a reduction reaction occurs at the second electrode.

2. The method of claim 1, wherein the electrolyte solution comprising chloride ions comprises salinated water.

3. The method of claim 2, wherein the electrolyte solution comprises seawater.

4. The method of claim 2, wherein the second electrode is a sodium-storage electrode and the reduction reaction comprises reducing the sodium-storage electrode to store sodium ions.

5. The method of claim 2, wherein the second electrode is a hydrogen evolution electrode and the reduction reaction comprises reducing water to hydrogen.

6. The method of claim 2, wherein the second electrode is an oxygen reduction electrode and the reduction reaction comprises reducing oxygen to hydroxide ions or hydrogen peroxide.

7. The method of claim 1, further comprising:
generating a reverse flow of electrons, such that electrons travel from the second electrode to the chloride-storage electrode, whereby the BiOCl is reduced to Bi and chloride ions are released from the chloride-storage electrode and an oxidation reaction occurs at the second electrode.

8. The method of claim 7, wherein the second electrode is a sodium-storage electrode and the oxidation reaction comprises oxidizing the sodium-storage electrode to release sodium ions.

9. The method of claim 7, wherein the oxidation reaction is the oxidation of a metal with an oxidation potential.

10. The method of claim 7, wherein the oxidation reaction comprises oxidizing chloride to chlorine gas.

11. The method of claim 7, wherein the oxidation reaction comprises oxidizing an organic molecule.

* * * * *